United States Patent
Nakatsuji et al.

(10) Patent No.: US 8,890,483 B2
(45) Date of Patent: Nov. 18, 2014

(54) PROTECTION CIRCUIT, BATTERY PACK AND CHARGING SYSTEM

(75) Inventors: Toshiyuki Nakatsuji, Hyogo (JP); Toshiaki Ishikawa, Osaka (JP); Yoshikazu Kiyohara, Osaka (JP)

(73) Assignee: Panasonic Corporation, Osaka (JP)

( * ) Notice: Subject to any disclaimer, the term of this patent is extended or adjusted under 35 U.S.C. 154(b) by 685 days.

(21) Appl. No.: 13/143,910

(22) PCT Filed: Jul. 30, 2010

(86) PCT No.: PCT/JP2010/004840
§ 371 (c)(1),
(2), (4) Date: Jul. 8, 2011

(87) PCT Pub. No.: WO2011/013384
PCT Pub. Date: Feb. 3, 2011

(65) Prior Publication Data
US 2011/0273137 A1    Nov. 10, 2011

(30) Foreign Application Priority Data

Jul. 31, 2009  (JP) ................................. 2009-178898
Aug. 20, 2009  (JP) ................................. 2009-190873

(51) Int. Cl.
| H02J 7/04 | (2006.01) |
| H02J 7/16 | (2006.01) |
| H01M 10/42 | (2006.01) |
| H01M 2/34 | (2006.01) |
| H01M 10/48 | (2006.01) |
| H02J 7/00 | (2006.01) |

(52) U.S. Cl.
CPC ............... *H01M 10/42* (2013.01); *H01M 2/34* (2013.01); *H01M 10/48* (2013.01); *H02J 7/0031* (2013.01)

USPC .......................................... 320/150; 320/134

(58) Field of Classification Search
USPC ......................... 320/134–136, 150, 153–154
See application file for complete search history.

(56) References Cited

U.S. PATENT DOCUMENTS

| 6,992,463 B2* | 1/2006 | Yoshio ........................... 320/134 |
| 7,079,003 B2* | 7/2006 | Furuta et al. .................. 337/184 |

(Continued)

FOREIGN PATENT DOCUMENTS

| JP | 2000-166107 | 6/2000 |
| JP | 2007-215310 | 8/2007 |

(Continued)

*Primary Examiner* — Samuel Berhanu
(74) *Attorney, Agent, or Firm* — McDermott Will & Emery LLP

(57) ABSTRACT

A protection circuit having: a connecting terminal for receiving a voltage for charging a rechargeable battery; a switching element interposed between the connecting terminal and the rechargeable battery; a temperature fuse for blocking a conductive path between the connecting terminal and the switching element; a heater for melting the temperature fuse; a voltage detection unit for detecting a voltage relating to the conductive path; a first abnormality detection unit for detecting occurrence of a first abnormality that is pre-set as a recoverable abnormality; a second abnormality detection unit for detecting occurrence of a second abnormality that is pre-set as an abnormality on the basis of which the temperature fuse should be melted; a protection control unit for turning OFF the switching element when the first abnormality is detected by the first abnormality detection unit; and a heater control unit for executing a temperature fuse melting process of applying the voltage of the conductive path to the heater when the second abnormality is detected by the second abnormality detection unit and the voltage detected by the voltage detection unit is not less than a predetermined threshold voltage.

17 Claims, 6 Drawing Sheets

(56) References Cited

U.S. PATENT DOCUMENTS

| | | |
|---|---|---|
| 7,638,977 B2 * | 12/2009 | Park .............................. 320/136 |
| 2003/0134183 A1 * | 7/2003 | Iwasaki et al. ................. 429/62 |
| 2007/0188148 A1 | 8/2007 | Kawasumi et al. |
| 2008/0116851 A1 * | 5/2008 | Mori ............................. 320/134 |

FOREIGN PATENT DOCUMENTS

| | | |
|---|---|---|
| JP | 2008-027826 | 2/2008 |
| JP | 2008-259386 | 10/2008 |

* cited by examiner

PROTECTION CIRCUIT, BATTERY PACK AND CHARGING SYSTEM

RELATED APPLICATIONS

This application is the U.S. National Phase under 35 U.S.C. §371 of International Application No. PCT/JP2010/004840, filed on Jul. 30, 2010, which in turn claims the benefit of Japanese Application Nos. 2009-178898, filed on Jul. 31, 2009 and 2009-190873, filed on Aug. 20, 2009, the disclosures of which Applications are incorporated by reference herein.

TECHNICAL FIELD

The present invention relates to a protection circuit of a rechargeable battery, and to a battery pack having the protection circuit and a charging system.

BACKGROUND ART

Conventionally, known is a battery pack having a rechargeable battery in which temperature fuses are connected to the rechargeable battery in series. When this kind of battery pack detects an abnormality of the rechargeable battery, it causes a heater to generate heat based on the output voltage of the rechargeable battery to melt the temperature fuses so that the battery pack can no longer be used on a permanent basis.

Nevertheless, if the battery voltage of the rechargeable battery is low, there are cases where the amount of heat generated by the heater is insufficient even if the battery voltage is applied to the heater, whereby the temperature fuses will not melt. In the foregoing case, in addition to the temperature fuses not melting, there is also a drawback in that the heater within the battery pack will continue to generate heat and cause the temperature of the battery pack to increase.

Thus, known is technology for causing the heater to generate heat and melt the temperature fuses by waiting for the rechargeable battery to be charged so that the battery voltage reaches a predetermined voltage in cases where the battery voltage of the rechargeable battery is less than a predetermined voltage capable of melting the temperature fuses (for example, refer to Patent Document 1).

Meanwhile, if there is any abnormality which may melt the fuses, from the perspective of safety, it is desirable to melt the fuses without discharging the rechargeable battery as much as possible. This is because, when discharging the rechargeable battery and using its power to melt the fuses, the temperature of the rechargeable battery will further rise due to the discharge.

Nevertheless, since the technology described in Patent Document 1 melts the temperature fuses by discharging the rechargeable battery when there is an abnormality that may melt the fuses, there is a drawback in that this is undesirable from the perspective of safety.

Patent Document 1: Japanese Patent Application Publication No. 2007-215310

SUMMARY OF INVENTION

Thus, an object of this invention is to provide a protection circuit of a rechargeable battery capable of reducing the occasions of discharging the rechargeable battery upon melting the temperature fuse, as well as a battery pack and a charging system having such a protection circuit.

The protection circuit according to one aspect of the present invention has: a connecting terminal for receiving a voltage for charging a rechargeable battery; a switching element interposed between the connecting terminal and the rechargeable battery; a temperature fuse for blocking a conductive path between the connecting terminal and the switching element; a heater for melting the temperature fuse; a voltage detection unit for detecting a voltage relating to the conductive path; a first abnormality detection unit for detecting occurrence of a first abnormality that is pre-set as a recoverable abnormality; a second abnormality detection unit for detecting occurrence of a second abnormality that is pre-set as an abnormality on the basis of which the temperature fuse should be melted; a protection control unit for turning OFF the switching element when the first abnormality is detected by the first abnormality detection unit; and a heater control unit for executing a temperature fuse melting process of applying the voltage of the conductive path to the heater when the second abnormality is detected by the second abnormality detection unit and the voltage detected by the voltage detection unit is not less than a predetermined threshold voltage.

Moreover, the battery pack according to one aspect of the present invention has a protection circuit and a rechargeable battery.

Furthermore, the charging system according to one aspect of the present invention has a protection circuit, a rechargeable battery, and a charging unit.

DESCRIPTION OF EMBODIMENTS

Figure 1:
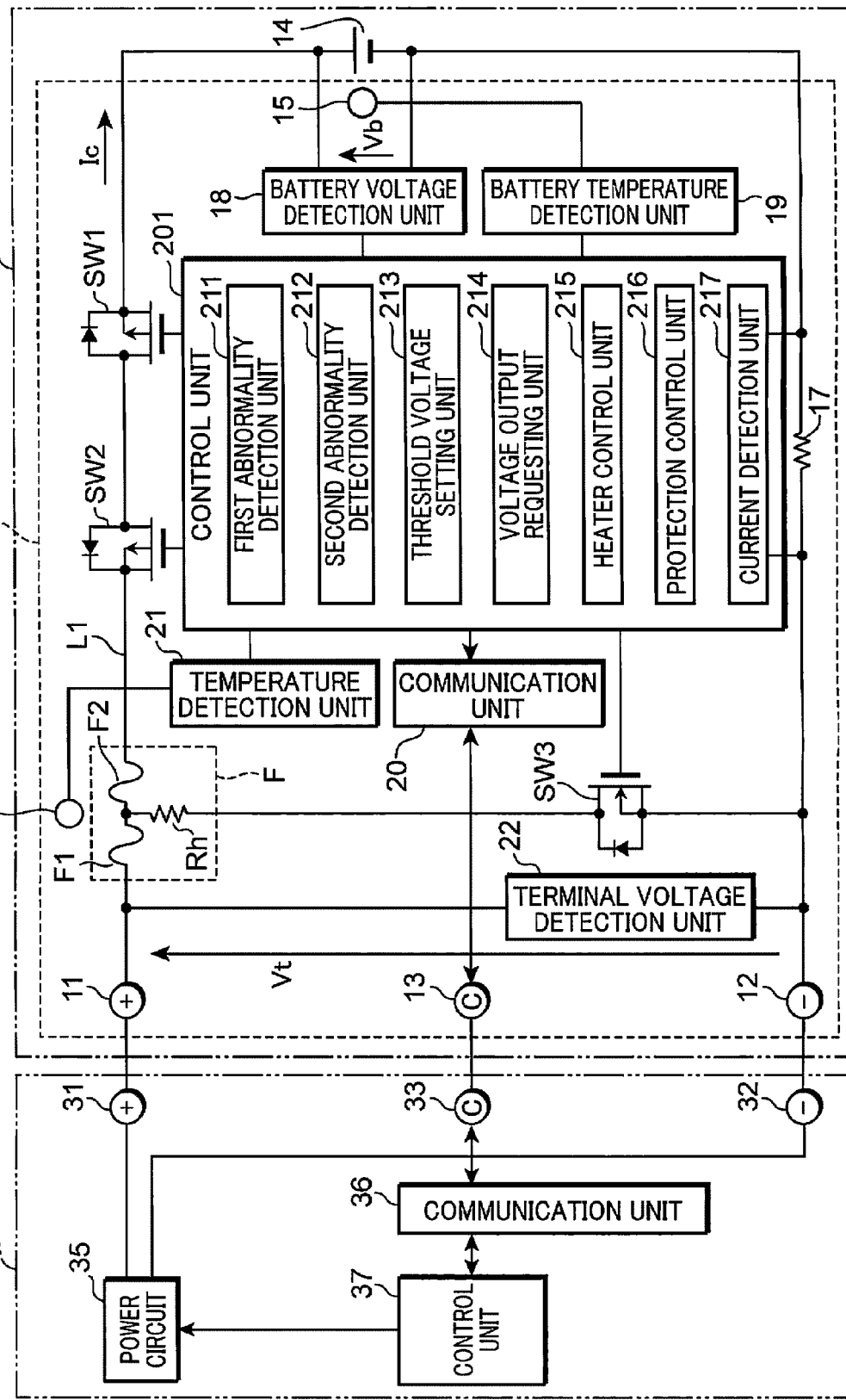
FIG. 1 is a block diagram showing an example of the configuration of the battery pack having the protection circuit and the charging system according to the first embodiment of the present invention.

Embodiments of the present invention are now explained with reference to the attached drawings. Note that the same constituent elements in the respective drawings are given the same reference numeral, and the explanation thereof is omitted.

(First Embodiment)

FIG. 1 is a block diagram showing an example of the configuration of a battery pack 1 having a protection circuit 2 and a charging system 100 according to the first embodiment of the present invention.

The charging system 100 is configured by the battery pack 1 and the charging device 3 (charging unit) being connected. Note that the charging device 3 may be built into, for example, a battery-mounted device of various electronic devices such as portable personal computers, digital cameras and cell phones, and vehicles such as electrical vehicles and hybrid cars, and the charging system 100 may be configured as the foregoing battery-mounted device.

The charging device 3 may be, for example, a power circuit for generating a charging current of the battery pack 1 from a commercial power voltage, or a power generator that generates energy based on natural energy such as solar light, wind power or water power, or a power generator that generates energy based on the power of an internal combustion engine or the like.

The battery pack 1 comprises a protection circuit 2 and a rechargeable battery 14. Moreover, the protection circuit 2 comprises a connecting terminal 11 (first connecting terminal), a connecting terminal 12 (second connecting terminal), a connecting terminal 13, temperature sensors 15, 16, a current sensing resistor 17, a battery voltage detection unit 18, a battery temperature detection unit 19, a communication unit 20, a temperature detection unit 21, a terminal voltage detection unit 22, a control unit 201, a discharge switching element SW1, a charge switching element SW2, a heater switching element SW3, temperature fuses F1, F2, and a heater Rh.

Note that the protection circuit 2 does not necessarily have to be built into the battery pack. For example, the protection circuit 2 may be configured as an in-car ECU (Electric Control Unit), or built into a battery-mounted device.

The charging device 3 comprises connecting terminals 31, 32, 33, a power circuit 35, a communication unit 36, and a control unit 37. The power circuit 35 is connected to the power-feeding connecting terminals 31, 32, and the communication unit 36 is connected to the connecting terminal 33.

Moreover, when the battery pack 1 is mounted on the charging device 3, the connecting terminals 11, 12, 13 of the battery pack 1 and the connecting terminals 31, 32, 33 of the charging device 3 become respectively connected.

The communication units 20, 36 are communication interface circuits which are configured to enable mutual data transmission and reception via the connecting terminals 13, 33. The power circuit 35 is a power circuit for supplying the current and voltage to the battery pack 1 via the connecting terminals 31, 32 according to the control signal from the control unit 37.

The control unit 37 is a control circuit that is configured, for example, using a microcomputer. When a request command sent from the control unit 201 to the communication unit 20 in the battery pack 1 is received by the communication unit 36, the control unit 37 controls the power circuit 35 according to the request command received by the communication unit 36 in order to output the current or voltage from the power circuit 35 to the connecting terminals 11, 12 according to the request command sent from the battery pack 1.

The connecting terminal 11 is connected to a positive electrode of the rechargeable battery 14 via the temperature fuses F1, F2, the charge switching element SW2, and the discharge switching element SW1. As a result of being melted, the temperature fuses F1, F2 block the conductive path L1 between the connecting terminal 11 and the charge switching element SW2.

For example, a p-channel FET (Field Effect Transistor) is used as the discharge switching element SW1 and the charge switching element SW2. For example, an n-channel FET is used as the heater switching element SW3.

The charge switching element SW2 and the discharge switching element SW1 respectively include a parasitic diode. The parasitic diode of the charge switching element SW2 is disposed so that the flow direction of the discharging current of the rechargeable battery 14 is directed toward the forward direction of that parasitic diode. Consequently, when the charge switching element SW2 is turned OFF, it only blocks the current in the charging direction of the rechargeable battery 14.

Moreover, the parasitic diode of the discharge switching element SW1 is disposed so that the flow direction of the charging current of the rechargeable battery 14 is directed toward the forward direction of that parasitic diode. Consequently, when the discharge switching element SW1 is turned OFF, it only blocks the current in the discharging direction of the rechargeable battery 14.

Moreover, the connecting terminal 12 is connected to a negative electrode of the rechargeable battery 14 via the current sensing resistor 17, and a current path from the connecting terminal 11 to the connecting terminal 12 is configured via the temperature fuses F1, F2, the charge switching element SW2, the discharge switching element SW1, the rechargeable battery 14, and the current sensing resistor 17. The connecting terminal 12 is a circuit ground.

Note that the connecting terminals 11, 12, 13 will suffice so as long as they are able to electrically connect the battery pack 1 and the charging device 3 or an external circuit, and may be, for example, electrodes, connectors or terminal blocks, or may be wiring patterns such as lands or pads.

One end of the heater Rh is connected to one point of the conductive path L1; for example, a connection point of the temperature fuse F1 and the temperature fuse F2, and the other end is connected to the connecting terminal 12; that is, the circuit ground, via the heater switching element SW3.

Note that it is also possible to use a the temperature fuse F with a heater that is sealed in a single package in a state where the temperature fuses F1, F2 are connected in series and the connection point of the temperature fuses F1, F2 is connected to the heater Rh. Moreover, it is possible to use only one temperature fuse.

The current sensing resistor 17 converts the charging current and the discharging current of the rechargeable battery 14 into a voltage value.

The rechargeable battery 14 may be, for example, a cell, an assembled battery in which a plurality of rechargeable batteries are connected in series, an assembled battery in which a plurality of rechargeable batteries are connected in parallel, or an assembled battery in which a plurality of rechargeable batteries are combined and connected in series and in parallel. Various rechargeable batteries such as a lithium ion rechargeable battery and a nickel hydride rechargeable battery may be used as the rechargeable battery 14.

The battery voltage detection unit 18, the battery temperature detection unit 19, the temperature detection unit 21, and the terminal voltage detection unit 22 are configured, for example, using an A/D conversion circuit.

The battery voltage detection unit 18 detects the battery voltage Vb of the rechargeable battery 14, and outputs a signal showing the voltage value thereof to the control unit 201. The terminal voltage detection unit 22 detects the terminal voltage Vt between the connecting terminals 11, 12, and outputs a signal showing the voltage value thereof to the control unit 201. In the foregoing case, since the connecting terminal 11 is connected to one end of the conductive path L1, the terminal voltage Vt corresponds to an example of the voltage relating to the conductive path L1. In addition, the terminal voltage detection unit 22 corresponds to an example of the voltage detection unit.

The temperature sensors 15, 16 are temperature sensors that are configured, for example, using a thermistor or a thermocouple.

The temperature sensor 15 is disposed, for example, in close contact with the rechargeable battery 14 or near the rechargeable battery 14 to detect the temperature of the rechargeable battery 14, and outputs the voltage signal showing the temperature value thereof to the battery temperature detection unit 19. The battery temperature detection unit 19 outputs, based on the voltage signal output from the temperature sensor 15, a signal showing the temperature of the rechargeable battery 14 to the control unit 201.

The temperature sensor 16 is disposed, for example, in close contact with the temperature fuses F1, F2 (or the temperature fuse F with a heater), or near the temperature fuses F1, F2 (or the temperature fuse F with a heater) to detect the temperature t relating to the temperature fuses F1, F2, and outputs a voltage showing the temperature value thereof to the temperature detection unit 21. The temperature detection unit 21 outputs, to the control unit 201, a signal showing the temperature t based on the voltage signal output from the temperature sensor 16.

The temperature t is not limited to the actual temperature of the temperature fuses F1, F2, and will suffice so as long as it is a temperature related to the temperature of the temperature fuses F1, F2 such as the environmental temperature in the vicinity of the temperature fuses F1, F2. In the ensuing explanation, the temperature t is explained as the temperature of the temperature fuses F1, F2.

The control unit 201 is configured by comprising, for example, a CPU (Central Processing Unit) for executing predetermined arithmetic processing, a ROM (Read Only Memory) storing predetermined control programs, a RAM (Random Access Memory) for temporarily storing data, an A/D conversion circuit, and peripheral circuits thereof.

As a result of executing the control programs stored in the ROM, the control unit 201 functions as the first abnormality detection unit 211, the second abnormality detection unit 212, the threshold voltage setting unit 213, the voltage output requesting unit 214, the heater control unit 215, the protection control unit 216, and the current detection unit 217.

The current detection unit 217 acquires the charging/discharging current value Ic flowing to the rechargeable battery 14 by detecting the voltage Vr between both ends of the current sensing resistor 17 and dividing such voltage Vr by the resistance value R of the current sensing resistor 17.

The first abnormality detection unit 211 detects the occurrence of a first abnormality that is pre-set as a recoverable abnormality, and notifies the protection control unit 216. Specifically, for example, as the first abnormality, an abnormality to the effect that the rechargeable battery 14 will be subject to an overcharge or overdischarge, or reach a temperature to the extent that it will not cause permanent damage to the rechargeable battery 14.

For example, the first abnormality detection unit 211 detects the occurrence of a first abnormality if the battery voltage Vb detected by the battery voltage detection unit 18 exceeds a first overcharge voltage value that was pre-set to a value that exceeds the full charge voltage. For instance, if the rechargeable battery 14 is a lithium ion rechargeable battery, by setting the voltage worth one of the cells configuring the rechargeable battery 14 to 4.228 V, a value obtained by multiplying 4.228 V to the number of cells connected in series in the rechargeable battery 14 can be used as the first overcharge voltage value.

Moreover, for example, the first abnormality detection unit 211 also detects the occurrence of a first abnormality if the battery voltage Vb detected by the battery voltage detection unit 18 becomes a voltage that falls below an overdischarge voltage value that was pre-set for preventing the overdischarge of the rechargeable battery 14. For instance, if the rechargeable battery 14 is a lithium ion rechargeable battery, by setting the voltage worth one of the cells configuring the rechargeable battery 14 to 2.5 V, a value obtained by multiplying 2.5 V to the number of cells connected in series in the rechargeable battery 14 can be used as the overdischarge voltage value.

Moreover, for example, the first abnormality detection unit 211 also detects the occurrence of a first abnormality if the temperature of the rechargeable battery 14 detected by the battery temperature detection unit 19 exceeds a first abnormality determination temperature; for example, 60° C., that was pre-set as the temperature which may deteriorate the rechargeable battery 14, and becomes an abnormally high temperature.

Note that different temperatures may be used as the first abnormality determination temperature during charging and during discharging such as using 60° C. during charging and using 73° C., which is higher than during charging, during discharging.

Moreover, since the first abnormality is a recoverable abnormality, if the first abnormality detection unit 211 detects that the detected first abnormality has been resolved, it notifies the resolution of the first abnormality to the protection control unit 216.

The second abnormality detection unit 212 detects the occurrence of a second abnormality that was pre-set as an abnormality in which the charge/discharge of the rechargeable battery 14 should be prohibited on a permanent basis, and notifies the protection control unit 216 and the heater control unit 215. Specifically, as the second abnormality, an overcharge, heat generation or the like of a level that may permanently damage the rechargeable battery 14 is set.

For example, the second abnormality detection unit 212 detects the occurrence of a second abnormality if the battery voltage Vb detected by the battery voltage detection unit 18 additionally exceeds a second overcharge voltage value that was pre-set as a voltage value exceeding the first overcharge voltage value as the voltage that may permanently damage the rechargeable battery 14. For example, if the rechargeable battery 14 is a lithium ion rechargeable battery, by setting the voltage worth one of the cells configuring the rechargeable battery 14 to 4.28 V, a value obtained by multiplying 2.5 V to the number of cells connected in series in the rechargeable battery 14 can be used as the second overcharge voltage value.

Moreover, for example, the second abnormality detection unit 212 also detects the occurrence of a second abnormality if the temperature of the rechargeable battery 14 detected by the battery temperature detection unit 19 exceeds a second abnormality determination temperature; for example, 90° C., that was pre-set as the temperature which may melt the separator inside the rechargeable battery 14.

The protection control unit 216 turns OFF the discharge switching element SW1 or the charge switching element SW2 and prohibits and discharge or charge of the rechargeable battery 14 if a first abnormality is detected by the first abnormality detection unit 211, and thereby protects the rechargeable battery 14 from deterioration.

For example, if the battery voltage Vb detected by the battery voltage detection unit 18 exceeds the first overcharge voltage value and becomes a first abnormality, the protection control unit 216 turns OFF the charge switching element SW2 to prohibit charging, and thereby prevents the overcharge of the rechargeable battery 14.

Moreover, if the battery voltage Vb detected by the battery voltage detection unit 18 falls below the overdischarge voltage value and becomes a first abnormality, the protection control unit 216 turns OFF the discharge switching element SW1 to prohibit discharging, and thereby prevents the deterioration of the rechargeable battery 14 caused by overdischarge.

In addition, if a second abnormality is detected by the second abnormality detection unit 212, the protection control unit 216 turns OFF both the discharge switching element SW1 and the charge switching element SW2. If a second abnormality is detected by the second abnormality detection unit 212, the temperature fuses F1, F2 are melted with the heater control unit 215. However, the melting of the temperature fuses F1, F2 may take time, or there may be cases where the temperature fuses F1, F2 cannot be melted depending on the voltage supply status from the charging device 3 or the terminal voltage of the rechargeable battery 14.

Thus, the protection control unit 216 turns OFF both the discharge switching element SW1 and the charge switching element SW2 if a second abnormality is detected by the second abnormality detection unit 212. Consequently, even in cases where much time is required for melting the temperature fuses F1, F2 or it was not possible to melt the temperature fuses F1, F2, it is possible to improve the safety of the battery pack 1 since the charge/discharge of the rechargeable battery 14 can be promptly prohibited.

Note that the configuration is not limited to the example of comprising the discharge switching element SW1 and the charge switching element SW2, and is it also possible to comprises one switching element for blocking the charge/discharge path of the rechargeable battery 14, and the protection control unit 216 may thereby turn OFF that switching element when a first abnormality or a second abnormality is detected.

The threshold voltage setting unit 213 sets the threshold voltage Vth, which is used for determining whether the battery voltage Vb of the rechargeable battery 14 is able to melt the temperature fuses F1, F2 by causing the heater Rh to generate heat, to be lower as the temperature t detected by the temperature detection unit 21 rises.

A temperature fuse is easy to melt as the temperature is higher, and difficult to melt if the temperature is low. Thus, the minimum battery voltage Vb capable of obtaining the amount of heat generation which is required for the heater Rh to melt the temperature fuses F1, F2 is obtained, for example, experimentally in advance according to the temperature t of the temperature fuses F1, F2, and stored in a ROM as a data table.

The threshold voltage setting unit 213 may, for example, refer to the data table and set the threshold voltage Vth by acquiring the minimum battery voltage Vb capable of melting the temperature fuses F1, F2 at the temperature t based on the temperature t detected by the temperature detection unit 21. Consequently, since a temperature fuse is easy to melt as the temperature is higher and difficult to melt if the temperature is low, the threshold voltage Vth is set to be a lower voltage value as the temperature t is higher.

The heater control unit 215 turns ON the heater switching element SW3 if a second abnormality is detected by the second abnormality detection unit 212 and the voltage between the connecting terminals 11, 12 detected by the terminal voltage detection unit 22 exceeds the threshold voltage Vth set with the threshold voltage setting unit 213, and thereby causes the heater Rh to generate heat by applying, to the heater Rh, the voltage of the conductive path L1; that is, the voltage between the conductive path L1 and the connecting terminal 12 as the circuit ground.

Here, if a second abnormality is detected by the second abnormality detection unit 212, since both the discharge switching element SW1 and the charge switching element SW2 are turned OFF with the protection control unit 216, current is not supplied from the rechargeable battery 14 to the heater Rh even if the heater switching element SW3 is turned ON. Consequently, the current supplied from the charging device 3 will be supplied to the heater Rh via the conductive path L1 and the heater switching element SW3.

Note that, when a second abnormality is detected by the second abnormality detection unit 212, the protection control unit 216 does not necessarily have to turn OFF both the discharge switching element SW1 and the charge switching element SW2.

In the foregoing case, since the determination conditions of a second abnormality by the second abnormality detection unit 212 are more strict than the determination conditions of a first abnormality by the first abnormality detection unit 211, if a second abnormality is detected by the second abnormality detection unit 212, under normal circumstances, a first abnormality is detected by the first abnormality detection unit 211 before the detection of the second abnormality, and at least either the discharge switching element SW1 or the charge switching element SW2 is turned OFF by the protection control unit 216.

Subsequently, for example, if a first abnormality is detected due to the overdischarge or temperature of the rechargeable battery 14, since the discharge switching element SW1 is turned OFF, current is not supplied from the rechargeable battery 14 to the heater Rh even if the heater switching element SW3 is turned ON. Such being the case, the current supplied from the charging device 3 will be supplied to the heater Rh via the conductive path L1 and the heater switching element SW3.

Moreover, even if a second abnormality is detected by the second abnormality detection unit 212, the heater control unit 215 turns ON the discharge switching element SW1 and the heater switching element SW3 if the terminal voltage Vt detected by the terminal voltage detection unit 22 is less than the threshold voltage Vth set with the threshold voltage setting unit 213, and, upon confirming the battery voltage Vb detected by the battery voltage detection unit 18, if such battery voltage Vb exceeds the threshold voltage Vth set with the threshold voltage setting unit 213, and thereby causes the heater Rh to generate heat by applying the voltage of the conductive path L1 to the heater Rh.

Subsequently, the heater control unit 215 determines that it is difficult to melt the temperature fuses F1, F2 and leaves the heater switching element SW3 turned OFF so that the heater Rh will not generate heat if the terminal voltage Vt detected by the terminal voltage detection unit 22 is less than the threshold voltage Vth and the battery voltage Vb detected by the battery voltage detection unit 18 is less than the threshold voltage Vth.

In addition, the heater control unit 215 causes a timer circuit not shown to time the elapsed time Tp after it was determined that it is difficult to melt the temperature fuses F1, F2. Subsequently, when the elapsed time Tp timed with the timer circuit becomes more than a time; for example, a waiting time Tw that is pre-set to approximately one hour, which may be sufficient for changing the environmental temperature of the battery pack 1 or starting the voltage supply from the charging device 3, and if the voltage between the connecting terminals 11, 12 detected by the terminal voltage detection unit 22 exceeds the threshold voltage Vth, the heater control unit 215 turns ON the heater switching element SW3 once again and attempts to melt the temperature fuses F1, F2.

Figure 2:
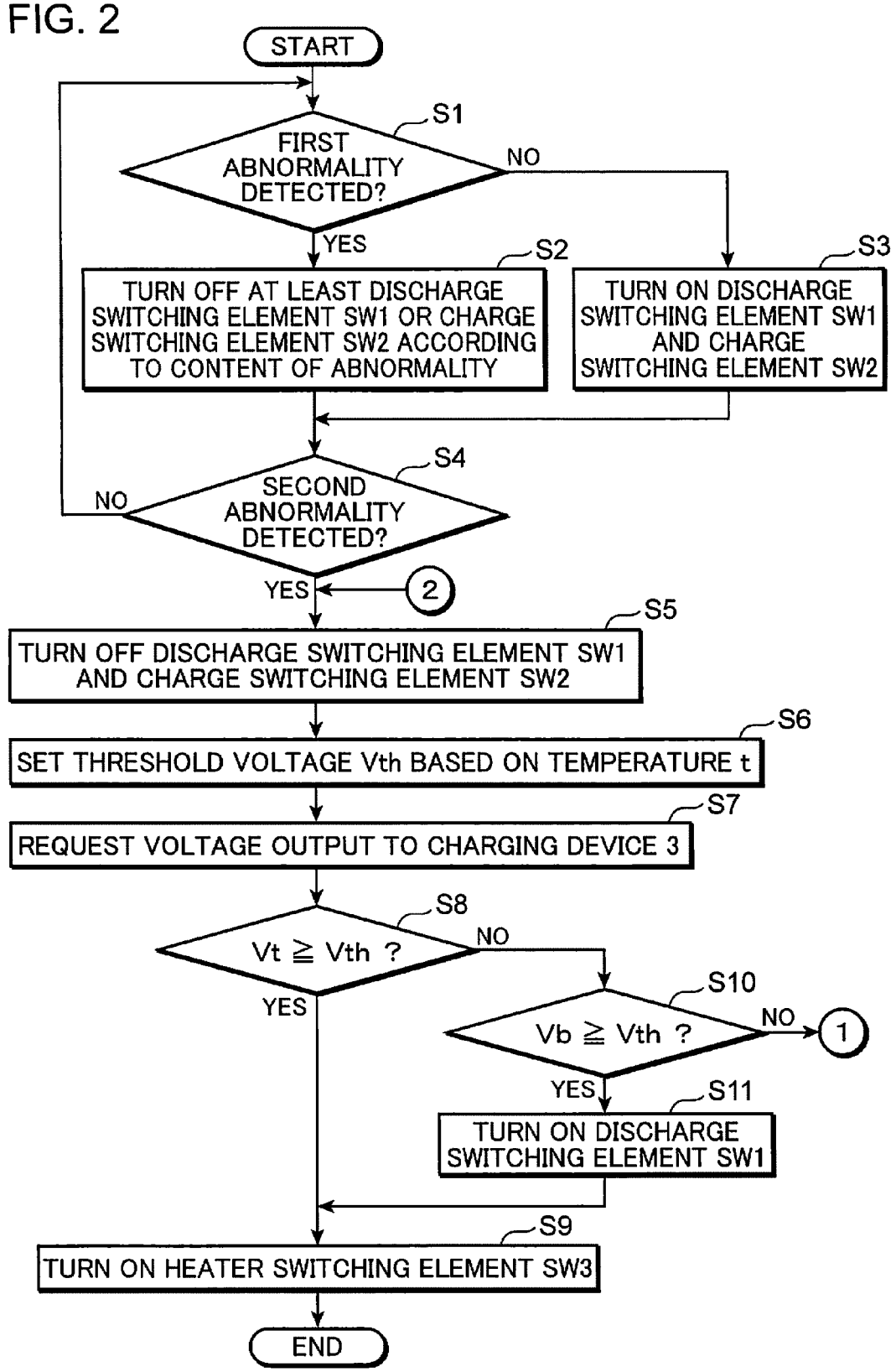
FIG. 2 is a flowchart showing an example of the operation of the protection circuit depicted in FIG. 1.
Figure 3:
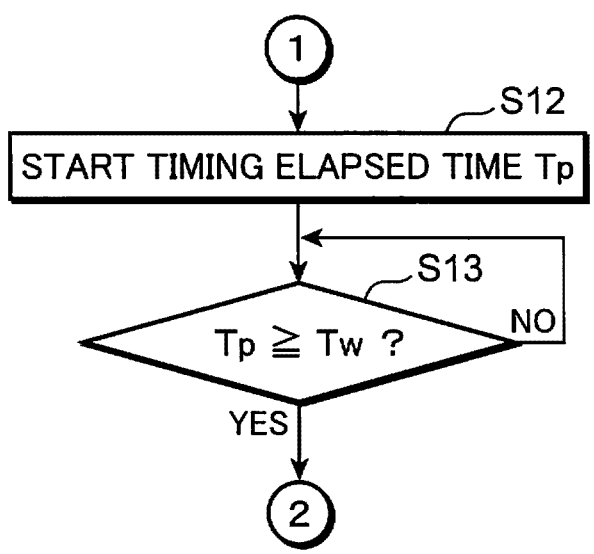
FIG. 3 is a flowchart showing an example of the operation of the protection circuit depicted in FIG. 1.

The operation of the protection circuit 2 configured as described above is now explained. FIG. 2 and FIG. 3 are flowcharts showing an example of the operation of the protection circuit 2 depicted in FIG. 1.

Foremost, the first abnormality detection unit 211 detects the occurrence of a first abnormality (step S1). If the occurrence of a first abnormality is not detected by the first abnormality detection unit 211 (NO at step S1), the protection control unit 216 turns ON the discharge switching element SW1 and the charge switching element SW2 to enable the charge/discharge of the rechargeable battery 14 (step S3), and the routine proceeds to step S4.

Meanwhile, if the first abnormality detection unit 211 detects the occurrence of a first abnormality (YES at step S1), the protection control unit 216 turns OFF at least either the discharge switching element SW1 or the charge switching element SW2 according to the content of the abnormality (step S2), and the routine proceeds to step S4. For example, if the first abnormality is an overcharge, only the charge switching element SW2 is turned OFF, and if the first abnormality is an overdischarge, only the discharge switching element SW1 is turned OFF, and if the first abnormality is an abnormally high temperature, both the discharge switching element SW1 and the charge switching element SW2 are turned OFF.

Subsequently, at step S4, the second abnormality detection unit 212 detects the occurrence of a second abnormality (step S4). If the occurrence of a second abnormality is not detected by the second abnormality detection unit 212 (NO at step S4), the routine returns to step S1 once again, and the first abnormality detection unit 211 confirms the occurrence of a first abnormality.

Here, since the first abnormality is a recoverable abnormality, if the first abnormality is resolved and the occurrence of a first abnormality is not detected by the first abnormality detection unit 211 (NO at step S1), at step S3, the protection control unit 216 turns ON both the discharge switching element SW1 and the charge switching element SW2 to enable the charge/discharge of the rechargeable battery 14 once again.

Meanwhile, at step S4, if the occurrence of a second abnormality is detected by the second abnormality detection unit 212 (YES at step S4), the protection control unit 216 turns OFF the discharge switching element SW1 and the charge switching element SW2 (step S5), and the charge/discharge of the rechargeable battery 14 is promptly prohibited.

Consequently, even in cases where both the discharge switching element SW1 and the charge switching element SW2 are turned ON such as when a second abnormality occurs, but it is not a first abnormality for example, the rechargeable battery 14 reaches its life duration, or in cases where only either the discharge switching element SW1 or the charge switching element SW2 is turned OFF at step S2, the safety can be improved since the charge/discharge of the rechargeable battery 14 can be promptly prohibited.

Subsequently, the threshold voltage setting unit 213 sets the threshold voltage Vth to be a lower voltage value as the temperature t detected by the temperature detection unit 21 rises (step S6).

Subsequently, the voltage output requesting unit 214 uses the communication unit 20 to send a request signal requesting an output of the heater voltage Vh set to be not less than the threshold voltage Vth to the charging device 3 (step S7). Consequently, if the charging device 3 is connected to the battery pack 1, this request signal is received by the communication unit 36 and output to the control unit 37. The control unit 37 thereby controls the power circuit 35 according to the request signal and applies the heater voltage Vh between the connecting terminals 11, 12.

The heater voltage Vh may be pre-set to a voltage value that is able to melt the temperature fuses F1, F2 regardless of the temperature t, or the threshold voltage Vth set with the threshold voltage setting unit 213 may be used as the heater voltage Vh as is.

Even if the charging device 3 is connected to the battery pack 1, it may not be outputting a voltage that is not less than the threshold voltage Vth capable of melting the temperature fuses F1, F2. Thus, as a result of the voltage output requesting unit 214 requesting the charging device 3 to output the heater voltage Vh and the charging device 3 outputting the heater voltage Vh between the connecting terminals 11, 12, it is possible to increase the opportunities for melting the temperature fuses F1, F2 with the output voltage of the charging device 3.

Moreover, with the background art described in Patent Document 1, upon melting the temperature fuses, it is likely that the rechargeable battery is unable to output a voltage of a level capable of melting the temperature fuses since the battery pack is subject to some kind of abnormality. Such being the case, there is a drawback in that, with the background art described in Patent Document 1, it is likely that the temperature fuses cannot be melted upon the occurrence of an abnormality.

Nevertheless, according to the protection circuit 2, since the temperature fuses F1, F2 are melted with the output voltage of the charging device 3, it is possible to increase the opportunities for melting the temperature fuses F1, F2 in comparison to the background art described in Patent Document 1.

Subsequently, the heater control unit 215 compares the terminal voltage Vt detected by the terminal voltage detection unit 22 and the threshold voltage Vth set with the threshold voltage setting unit 213 (step S8), and, if the terminal voltage Vt is not less than the threshold voltage Vth (YES at step S8), since the temperature fuses F1, F2 can be melted with the terminal voltage Vt, the heater control unit 215 turns ON the heater switching element SW3 (step S9).

Consequently, the heater voltage Vh supplied from the power circuit 35 is applied to the heater Rh via the connecting terminals 31, 11 and the temperature fuse F1 and causes the heater Rh to generate heat and melt the temperature fuses F1, F2.

Since it is thereby possible to melt the temperature fuses F1, F2 without having to discharge the rechargeable battery 14 in a state where a second abnormality has occurred, the safety can be improved as a result of reducing the occasions of discharging the rechargeable battery 14.

Meanwhile, if the terminal voltage Vt is less than the threshold voltage Vth (NO at step S8), since the temperature fuses F1, F2 cannot be melted with the terminal voltage Vt, the heater control unit 215 proceeds to step S10 in order to determine whether the temperature fuses F1, F2 can be melted with the discharge of the rechargeable battery 14.

Here, at step S6, the threshold voltage setting unit 213 sets the threshold voltage Vth to be a low voltage value as the current temperature t of the temperature fuses F1, F2 rises, and, for example, since the minimum battery voltage Vb capable of obtaining the amount of heat generation which is required for melting the temperature fuses F1, F2 with the heater Rh under the conditions of the temperature t is set as the threshold voltage Vth, unlike cases where the threshold voltage Vth is a fixed value, it is possible to reduce the possibility of losing opportunities for melting the temperature fuses F1, F2 as a result of the heater control unit 215 not melting the temperature fuses F1, F2 since the battery voltage Vb is less than the threshold voltage Vth set to cases when the temperature t is low, even in cases where the temperature fuses F1, F2 can be melted even though the battery voltage Vb is low since the temperature t is high.

Subsequently, the heater control unit 215 compares the battery voltage Vb detected by the battery voltage detection unit 18 and the threshold voltage Vth set with the threshold voltage setting unit 213 (step S10), and, if the battery voltage Vb is not less than the threshold voltage Vth (YES at step S10), since the temperature fuses F1, F2 can be melted with the battery voltage Vb, the heater control unit 215 turns ON the discharge switching element SW1 (step S11), and further turns ON the heater switching element SW3 (step S9).

Consequently, the battery voltage Vb supplied from the rechargeable battery 14 is applied to the heater Rh, and the heat generated by the heater Rh melts the temperature fuses F1, F2.

Here, since the temperature fuses F1, F2 are connected in series and the connection point of the temperature fuses F1, F2 is connected to the heater Rh, when the temperature fuses F1, F2 are melted, both the path (temperature fuse F1) for supplying the voltage from the power circuit 35 to the heater Rh via the connecting terminal 11 and the path (temperature fuse F2) for supplying the voltage from the rechargeable battery 14 to the heater Rh are blocked to stop the generation of heat by the heater Rh, the heater Rh will not continue to generate heat after the temperature fuses F1, F2 are melted.

According to the processing of steps S8, S10, S11, S9, the rechargeable battery 14 is discharged in order to melt the temperature fuses F1, F2. Nevertheless, if the discharge switching element SW1 and the charge switching element SW2 are merely turned OFF without the temperature fuses F1, F2 being melted, the battery voltage Vb of the rechargeable battery 14 will drop. Thus, eventually, it will not be possible to supply the power voltage for operating the control unit 201 or the discharge switching element SW1 and the charge switching element SW2, and it will become difficult to maintain the OFF state of the discharge switching element SW1 and the charge switching element SW2.

This is undesirable since it will eventually become impossible to protect the rechargeable battery 14 upon the occurrence of a second abnormality. Meanwhile, according to the processing of steps S8, S10, S11, S9, although the rechargeable battery 14 is temporarily discharged, this is preferable since the safety will increase if the temperature fuses F1, F2 can be melted in comparison to cases where the temperature fuses F1, F2 cannot be melted.

Moreover, since the melting of the temperature fuses F1, F2 by the discharge of the rechargeable battery 14 is limited to cases such as when a voltage that is not less than the threshold voltage Vth is not supplied between the connecting terminals 11, 12 even though the voltage output requesting unit 214 requests the charging device 3 to output the heater voltage Vh; for example, cases where the charging device 3 is not connected to the battery pack 1, it is possible to reduce the occasions of discharging the rechargeable battery in comparison to the technology which constantly melts the temperature fuses by discharging the rechargeable battery as with the background art.

Meanwhile, at step S10, if the battery voltage Vb is less than the threshold voltage Vth (NO at step S10), since the temperature fuses F1, F2 cannot be melted with either the terminal voltage Vt or the battery voltage Vb, the heater control unit 215 determines that it is difficult to melt the temperature fuses F1, F2, and proceeds to step S12 while maintaining the OFF state of the heater switching element SW3.

Consequently, even if the heater switching element SW3 is turned ON since the terminal voltage Vt and the battery voltage Vb are low, if it is considered that the temperature fuses F1, F2 cannot be melted due to the insufficient amount of heat generated by the heater Rh, the heater Rh will not generate heat. Thus, it is possible to reduce the possibility of causing the temperature of the battery pack 1 to rise while the temperature fuses F1, F2 are not melted.

Subsequently, at step S12, the heater control unit 215 uses a timer circuit not shown to time the elapsed time Tp from the time that the melting of the temperature fuses F1, F2 was determined to be difficult at step S11 (step S13). If the elapsed time Tp is not less than the waiting time Tw (YES at step S13), the heater control unit 215 attempts to melt the temperature fuses F1, F2 by repeating the processing of step S5 onward once again.

Specifically, even in cases where it is determined at step S10 that the melting of the temperature fuses F1, F2 is difficult even upon causing the heater Rh to generate heat, if time that is not less than the waiting time Tw has elapsed and the environmental temperature has risen during that time and the temperature t has consequently risen, or the charging device 3 is connected to the battery pack 1 during that time, there may be cases where the temperature fuses F1, F2 can be melted by repeating the processing of step S5 onward once again. It is thereby possible to increase the opportunities for melting the temperature fuses F1, F2.

Note that the configuration may be such that the threshold voltage setting unit 213 is not included, and a voltage value of a level capable of melting the temperature fuses F1, F2 with the amount of heat generated by the heater Rh regardless of the temperature t is pre-set as the threshold voltage Vth. Moreover, the configuration may be such that, if the terminal voltage Vt is less than the threshold voltage Vth at step S8 (NO at step S8), the heater control unit 215 determines that it is difficult to melt the temperature fuses F1, F2 without executing steps S10, S11, and proceeds to step S12.

Moreover, the configuration may also be such that the voltage output requesting unit 214 is not included and step S7 is not performed. Moreover, the protection control unit 216 does not have to perform step S5.

Even with the foregoing configurations, it is possible to reduce the occasions of discharging the rechargeable battery in comparison to the technology of melting the temperature fuses by discharging the rechargeable battery as with the background art.

The protection circuit, the battery pack, and the charging system configured as described above are able to reduce the occasions of discharging the rechargeable battery upon melting the temperature fuses, (Second Embodiment)

The technology described in Patent Document 1 as the background art melts the temperature fuses with a heater. Meanwhile, the temperature fuses are easy to melt if the temperature is high and difficult to melt if the temperature is low. Thus, when the temperature is high, the temperature fuses can be melted even if the amount of heat generated with the heater is low; that is, even if the battery voltage is low. Meanwhile, when the temperature is low, the temperature fuses cannot be melted if the amount of heat generated with the heater is low; that is, if the battery voltage is low.

Accordingly, with the background art described in Patent Document 1, it was necessary to set the foregoing predetermined voltage to a high voltage capable of melting the temperature fuses even during a low temperature in which it is difficult to melt the temperature fuses from the necessity of melting the temperature fuses regardless of the temperature.

Nevertheless, if the foregoing predetermined voltage is set to a high temperature capable of melting the temperature fuses even during a low temperature, there was a drawback in that, even though there is sufficient battery voltage for melting the temperature fuses during a high temperature, the melting of the temperature fuses is delayed until the rechargeable battery is charged and the battery reaches the predetermined voltage since the battery voltage is less than the foregoing predetermined voltage.

Moreover, since the rechargeable battery is subject to some kind of abnormality upon attempting to melt the temperature fuses, there may be cases where a user does not charge the battery pack. In the foregoing case, there is a drawback in that an opportunity for melting the temperature fuses will be lost upon waiting for the battery voltage to reach a predetermined voltage.

As described above, with the background art described in Patent Document 1, there is a drawback in that, even there is an opportunity for melting the temperature fuses even if the battery voltage is less than a predetermined voltage depending on the temperature of the temperature fuses, such an opportunity is lost, and the possibility of the melting of the temperature fuses being delayed, or not being able to melt the temperature fuses will increase.

According to the protection circuit and battery pack according to the second embodiment, it is possible to reduce the possibility of the melting of the temperature fuses being delayed, or not being able to melt the temperature fuses in comparison to the technology described in Patent Document 1.

Figure 4:
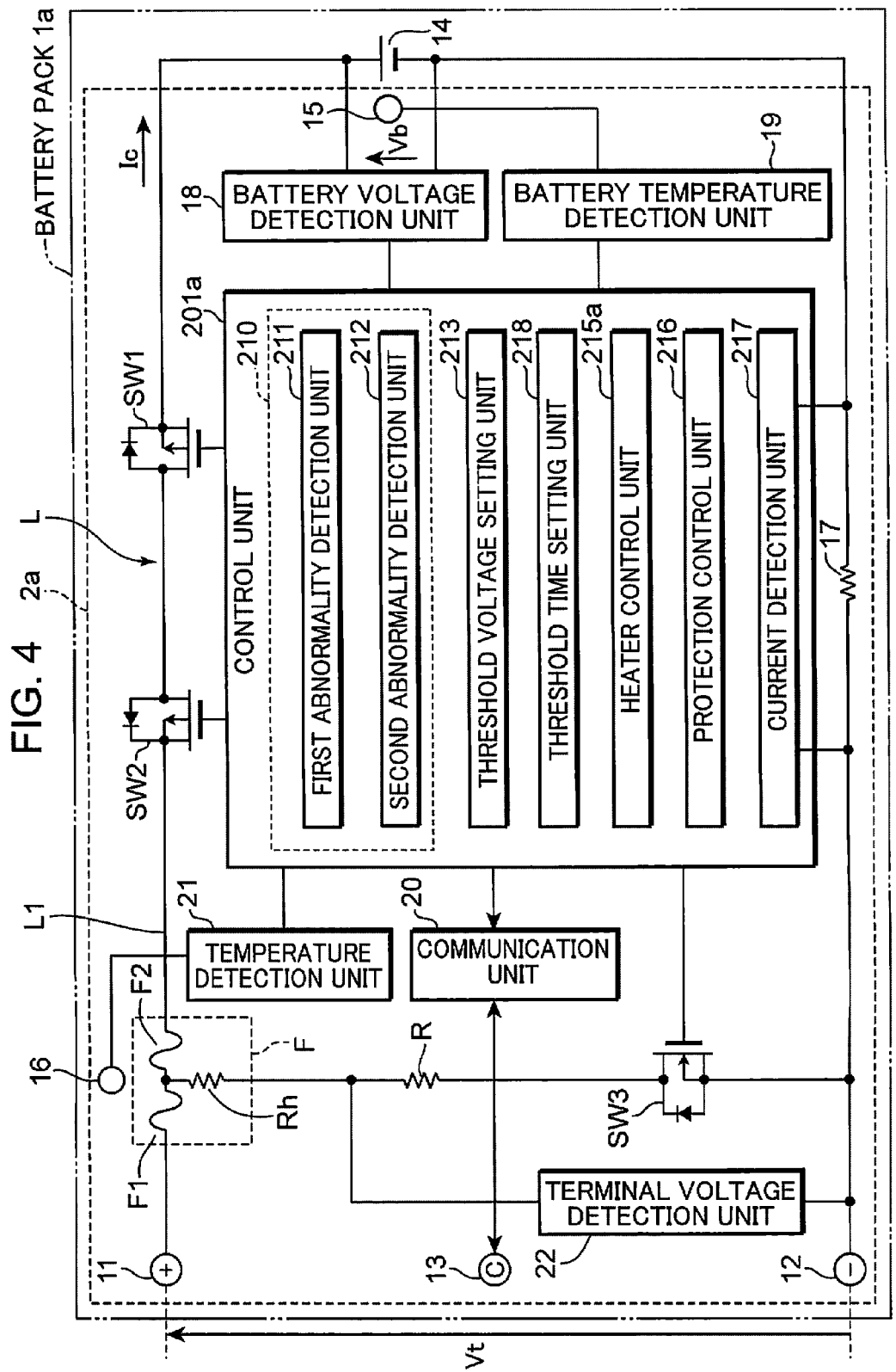
FIG. 4 is a block diagram showing an example of the configuration of the battery pack having the protection circuit according to the second embodiment of the present invention.

Embodiments of the present invention are now explained with reference to the attached drawings. Note that the same constituent elements in the respective drawings are given the same reference numeral, and the explanation thereof is omitted. FIG. 4 is a block diagram showing an example of the configuration of the battery pack 1a comprising the protection circuit 2a according to the second embodiment of the present invention.

The battery pack 1a comprises a protection circuit 2a and a rechargeable battery 14. Moreover, the protection circuit 2a comprises a connecting terminal 11 (first connecting terminal), a connecting terminal 12 (second connecting terminal), a connecting terminal 13, temperature sensors 15, 16, a current sensing resistor 17, a battery voltage detection unit 18, a battery temperature detection unit 19, a communication unit 20, a temperature detection unit 21, a terminal voltage detection unit 22, a control unit 201a, a discharge switching element SW1, a charge switching element SW2, a heater switching element SW3, temperature fuses F1, F2, a heater Rh, and a resistor R.

Note that the protection circuit 2a does not necessarily have to be built into the battery pack. For example, the protection circuit 2a may be configured as an in-car ECU (Electric Control Unit), or built into a battery-mounted device.

The connecting terminals 11, 12, 13 are connecting terminals connected to the charging device 3 shown in FIG. 1 as an external device not shown such as a battery-mounted device or a charging device. When the connecting terminals 11, 12, 13 are connected to the external device, the discharging current of the rechargeable battery 14 is supplied to the external device via the connecting terminals 11, 12, or the charging voltage output from the external device is applied to the rechargeable battery 14 via the connecting terminals 11, 12.

The communication unit 20 is a communication interface circuit which is configured to enable data transmission and reception to and from the external device with the connecting terminal 13.

The connecting terminal 11 is connected to a positive electrode of the rechargeable battery 14 by the conductive path L via the temperature fuses F1, F2, the charge switching element SW2, and the discharge switching element SW1. Among the conductive paths L, the section from the connecting terminal 11 to the charge switching element SW2 via the temperature fuses F1, F2 is the conductive path L1.

For example, a p-channel FET (Field Effect Transistor) is used as the discharge switching element SW1 and the charge switching element SW2. For example, an n-channel FET is used as the heater switching element SW3.

The charge switching element SW2 and the discharge switching element SW1 respectively include a parasitic diode. The parasitic diode of the charge switching element SW2 is disposed so that the flow direction of the discharging current of the rechargeable battery 14 is directed toward the forward direction of that parasitic diode. Consequently, when the charge switching element SW2 is turned OFF, it only blocks the current in the charging direction of the rechargeable battery 14.

Moreover, the parasitic diode of the discharge switching element SW1 is disposed so that the flow direction of the charging current of the rechargeable battery 14 is directed toward the forward direction of that parasitic diode. Consequently, when the discharge switching element SW1 is turned OFF, it only blocks the current in the discharging direction of the rechargeable battery 14.

Moreover, the connecting terminal 12 is connected to a negative electrode of the rechargeable battery 14 via the current sensing resistor 17, and a current path from the connecting terminal 11 to the connecting terminal 12 is configured via the temperature fuses F1, F2, the charge switching element SW2, the discharge switching element SW1, the rechargeable battery 14, and the current sensing resistor 17.

Note that the connecting terminals 11, 12, 13 will suffice so as long as they are able to electrically connect the battery pack 1a and the external device or an external circuit, and may be, for example, electrodes, connectors or terminal blocks, or may be wiring patterns such as lands or pads.

One end of the heater Rh is connected to one point of the conductive path L1; for example, a connection point of the temperature fuse F1 and the temperature fuse F2, and the other end is connected to the connecting terminal 12 via the resistor R and the heater switching element SW3.

Note that it is also possible to use a the temperature fuse F with a heater that is sealed in a single package in a state where the temperature fuses F1, F2 are connected in series and the connection point of the temperature fuses F1, F2 is connected to the heater Rh. Moreover, it is possible to use only one temperature fuse.

The current sensing resistor 17 converts the charging current and the discharging current of the rechargeable battery 14 into a voltage value.

The rechargeable battery 14 may be, for example, a cell, an assembled battery in which a plurality of rechargeable batteries are connected in series, an assembled battery in which a plurality of rechargeable batteries are connected in parallel, or an assembled battery in which a plurality of rechargeable batteries are combined and connected in series and in parallel. Various rechargeable batteries such as a lithium ion rechargeable battery and a nickel hydride rechargeable battery may be used as the rechargeable battery 14.

The battery voltage detection unit 18, the battery temperature detection unit 19, the temperature detection unit 21, and the terminal voltage detection unit 22 are configured, for example, using an A/D conversion circuit.

The battery voltage detection unit 18 detects the battery voltage Vb of the rechargeable battery 14, and outputs a signal showing the voltage value thereof to the control unit 201a. In the foregoing case, since the positive electrode of the rechargeable battery 14 is connected to the conductive path L1 via the discharge switching element SW1 and the charge switching element SW2, so as long as the discharge switching element SW1 and the charge switching element SW2 are turned ON, the terminal voltage Vt will be equal to the voltage of the conductive path L1; that is, the voltage between the conductive path L1 and the circuit ground. Accordingly, the battery voltage Vb corresponds to an example of the voltage relating to the conductive path L1. In addition, the battery voltage detection unit 18 corresponds to an example of the voltage detection unit.

The terminal voltage detection unit 22 detects the terminal voltage Vt between the connecting terminals 11, 12, and outputs a signal showing the voltage value thereof to the control unit 201a. The terminal voltage detection unit 22 detects the voltage at both ends of the series circuit of the resistor R and the heater switching element SW3, but if the heater switching element SW3 is turned OFF, the terminal voltage Vt between the connecting terminals 11, 12 can be detected since there will be no voltage drop in the resistors Rh, R.

Moreover, when the heater switching element SW3 is turned ON, the terminal voltage detection unit 22 will detect the battery voltage Vb, or a voltage in which the terminal voltage Vt is divided by the resistor Rh and the resistor R. In the foregoing case, if the resistance values of the resistors Rh, R are respectively Rh and R, the resistance values of the resistors Rh, R are set so that the relationship of Vj<Vth×R/(Rh+R) is satisfied relative to the determination voltage Vj described later and the threshold voltage Vth.

The resistor R is provided so that the terminal voltage detection unit 22 can stably detect the 0 V when the heater switching element SW3 is turned ON and the temperature fuses F1, F2 become an open state, and the voltage between the opened connecting terminals 11, 12 becomes unstable.

Note that, if the internal impedance is set to a small value; for example, to a value of 1 MΩ or less, the terminal voltage detection unit 22 is able to detect the 0 V when the connecting terminals 11, 12 become an open state. Thus, the configuration may be such that the resistor R is not included and the terminal voltage Vt between the connecting terminals 11, 12 is directly detected.

The temperature sensors 15, 16 are temperature sensors that are configured, for example, using a thermistor or a thermocouple.

The temperature sensor 15 is disposed, for example, in close contact with the rechargeable battery 14 or near the rechargeable battery 14 to detect the temperature of the rechargeable battery 14, and outputs the voltage signal showing the temperature value thereof to the battery temperature detection unit 19. The battery temperature detection unit 19 outputs, based on the voltage signal output from the temperature sensor 15, a signal showing the temperature of the rechargeable battery 14 to the control unit 201a.

The temperature sensor 16 is disposed, for example, in close contact with the temperature fuses F1, F2 (or the temperature fuse F with a heater), or near the temperature fuses F1, F2 (or the temperature fuse F with a heater) to detect the temperature t relating to the temperature fuses F1, F2, and outputs a voltage showing the temperature value thereof to the temperature detection unit 21. The temperature detection unit 21 outputs, to the control unit 201a, a signal showing the temperature t based on the voltage signal output from the temperature sensor 16.

The temperature t is not limited to the actual temperature of the temperature fuses F1, F2, and will suffice so as long as it is a temperature related to the temperature of the temperature fuses F1, F2 such as the environmental temperature in the vicinity of the temperature fuses F1, F2. In the ensuing explanation, the temperature t is explained as the temperature of the temperature fuses F1, F2.

The control unit 201a is configured by comprising, for example, a CPU (Central Processing Unit) for executing pre-determined arithmetic processing, a ROM (Read Only Memory) storing predetermined control programs, a RAM (Random Access Memory) for temporarily storing data, an A/D conversion circuit, and peripheral circuits thereof.

As a result of executing the control programs stored in the ROM, the control unit 201a functions as the abnormality detection unit 210, the threshold voltage setting unit 213, the threshold time setting unit 218, the heater control unit 215a, the protection control unit 216, and the current detection unit 217.

The current detection unit 217 acquires the charging/discharging current value Ic flowing to the rechargeable battery 14 by detecting the voltage Vr between both ends of the current sensing resistor 17 and dividing such voltage Vr by the resistance value R of the current sensing resistor 17.

The protection control unit 216 turns OFF the discharge switching element SW1 or the charge switching element SW2 and prohibits discharge or charge of the rechargeable battery 14 if a first abnormality within a recoverable range is detected, and thereby protects the rechargeable battery 14 from deterioration.

For example, if the battery voltage Vb detected by the battery voltage detection unit 18 exceeds the full charge voltage (or the first overcharge voltage value) of the rechargeable battery 14 and becomes a first abnormality, the protection control unit 216 turns OFF the charge switching element SW2 to prohibit charging, and thereby prevents the overcharge of the rechargeable battery 14.

Moreover, if the battery voltage Vb detected by the battery voltage detection unit 18 falls less or equal the discharge prohibition voltage Voff that is pre-set for preventing the overdischarge of the rechargeable battery 14 or falls below the overdischarge voltage value and becomes a first abnormality, the protection control unit 216 turns OFF the discharge switching element SW1 to prohibit discharging, and thereby prevents the deterioration of the rechargeable battery 14 caused by overdischarge.

The abnormality detection unit 210 includes the foregoing first abnormality detection unit 211 and the second abnormality detection unit 212. The second abnormality detection unit 212 of the abnormality detection unit 210 detects the occurrence of a second abnormality when an irrecoverable abnormality occurs or if the rechargeable battery 14 reaches its life duration.

For example, the abnormality detection unit 210 detects a second abnormality and notifies the heater control unit 215a if the temperature of the rechargeable battery 14 detected by the battery temperature detection unit 19 is not less than the temperature determination value is (second abnormality determination temperature) which is pre-set as the temperature which may melt the separator inside the rechargeable battery 14.

Moreover, the abnormality detection unit 210 detects a second abnormality and notifies the heater control unit 215a if the battery voltage Vb detected by the battery voltage detection unit 18 exceeds the full charge voltage of the rechargeable battery 14 and further exceeds the voltage determination value Vs (second overcharge voltage value) which is pre-set as the voltage that may cause irrecoverable damage to the rechargeable battery 14.

The threshold voltage setting unit 213 sets the threshold voltage Vth, which is used for determining whether the battery voltage Vb of the rechargeable battery 14 is able to melt the temperature fuses F1, F2 by causing the heater Rh to generate heat, to be lower as the temperature t detected by the temperature detection unit 21 rises.

A temperature fuse is easy to melt as the temperature is higher, and difficult to melt if the temperature is low. Thus, the minimum battery voltage Vb capable of obtaining the amount of heat generation which is required for the heater Rh to melt the temperature fuses F1, F2 is obtained, for example, experimentally in advance according to the temperature t of the temperature fuses F1, F2, and stored in a ROM as a data table.

The threshold voltage setting unit 213 may, for example, refer to the data table and set the threshold voltage Vth by acquiring the minimum battery voltage Vb capable of melting the temperature fuses F1, F2 at the temperature t based on the temperature t detected by the temperature detection unit 21. Consequently, since a temperature fuse is easy to melt as the temperature is higher and difficult to melt if the temperature is low, the threshold voltage Vth is set to be a lower voltage value as the temperature t is higher.

The threshold time setting unit 218 sets the threshold time Tth for determining that the temperature fuses F1, F2 will not melt even if heating is continued based on the elapsed time after the generation of heat by the heater Rh was actually started.

Since the temperature fuses F1, F2 melt easily if the temperature (environmental temperature) is high and are difficult to melt if the temperature is low, the temperature fuses F1, F2 melt in a shorter time as the temperature rises, and more time is required for melting the temperature fuses F1, F2 if the temperature is low. Similarly, the temperature fuses F1, F2 melt in a shorter time as the battery voltage Vb rises and the amount of heat generated by the heater Rh being great, and more time is required for melting the temperature fuses F1, F2 if the battery voltage Vb is low and the amount of heat generated by the heater Rh is small.

Thus, the threshold time setting unit 218 may set the threshold time Tth for determining that the temperature fuses F1, F2 will not melt even if heating is continued according to the current battery voltage Vb and temperature t by setting the threshold time Tth to be a short time as the battery voltage Vb detected by the battery voltage detection unit 18 rises and setting the threshold time Tth to be a short time as the temperature t detected by the temperature detection unit 21 rises.

Specifically, the time required for melting the temperature fuses F1, F2 is experimentally obtained in advance according to the combination of the battery voltage Vb and the temperature t, and the obtained melt time corresponding to the combination of the battery voltage Vb and the temperature t may be stored in a ROM as a data table. The threshold time setting unit 218 may also set the melt time obtained by referring to this kind of data table as the threshold time Tth.

Note that the threshold time setting unit 218 can also set the threshold time Tth by using only one of either the battery voltage Vb or the temperature t.

The heater control unit 215a forcibly turns ON the discharge switching element SW1 if an abnormality is detected by the abnormality detection unit 210 and the voltage detected by the battery voltage detection unit 18 exceeds the threshold voltage Vth set with the threshold voltage setting unit 213, and additionally turns ON the heater switching element SW3 so as to supply the battery voltage Vb of the rechargeable battery 14 to the heater Rh via the conductive path L1 and cause the heater Rh to generate heat.

Meanwhile, even in cases where a second abnormality is detected by the abnormality detection unit 210, the heater control unit 215a continues blocking the heater switching element SW3 and does not turn it ON if the voltage detected by the battery voltage detection unit 18 does not reach the threshold voltage Vth set with the threshold voltage setting unit 213.

Here, since the discharge switching element SW1 is still forcibly left ON, while the temperature fuses F1, F2 are being energized, the battery voltage Vb of the rechargeable battery 14 is supplied to the connecting terminal 11 via the discharge switching element SW1, the charge switching element SW2, and the temperature fuses F1, F2.

Subsequently, when the temperature fuses F1, F2 are melted with the heat generated by the heater Rh, the battery voltage Vb of the rechargeable battery 14 is not supplied to the connecting terminal 11 and the terminal voltage detection unit 22. Accordingly, the voltage between the connecting terminals 11, 12; that is, the detection voltage of the terminal voltage detection unit 22 will be approximately zero.

Thus, heater control unit 215a uses a timer circuit not shown for timing the elapsed time T1 after turning ON the heater switching element SW3, and monitors the terminal voltage Vt (voltage in which the battery voltage Vb or the terminal voltage Vt is divided with the resistor Rh or the resistor R) between the connecting terminals 11, 12 detected by the terminal voltage detection unit 22.

Note that the terminal voltage detection unit 22 is not directly detecting the terminal voltage Vt when the heater switching element SW3 is turned ON. Nevertheless, since the terminal voltage detection unit 22 indirectly detects the terminal voltage Vt by detecting the voltage that was divided by the resistor Rh and the resistor R, in order to simplify the explanation in the following description, the explanation is made to the effect that the terminal voltage detection unit 22 detects the terminal voltage Vt even when the heater switching element SW3 is turned ON.

Even if the elapsed time T1 timed with the timer circuit exceeds the threshold time Tth set with the threshold time setting unit 218, the heater control unit 215a determines that the temperature fuses F1, F2 will not melt even if the generation of heat with the heater Rh is continued if the terminal voltage Vt detected by the terminal voltage detection unit 22 exceeds the pre-set determination voltage Vj, and turns OFF the heater switching element SW3.

The determination voltage Vj is set in advance, for example, as a voltage value that is slighter greater than the voltage that may arise due to influences such as measuring errors or noise of the terminal voltage detection unit 22. Accordingly, if the terminal voltage Vt exceeds the determination voltage Vj, the battery voltage Vb of the rechargeable battery 14 is being supplied to the connecting terminal 11 via the temperature fuses F1, F2; that is, it is considered that the temperature fuses F1, F2 have not melted.

In addition, the heater control unit 215a uses a timer circuit not shown to time the elapsed time T2 after determining that the temperature fuses F1, F2 will not melt even if the generation of heat with the heater Rh is continued, and turning OFF the heater switching element SW3.

When the elapsed time T2 timed with the timer circuit becomes more than a time; for example, a waiting time Tw that is pre-set to approximately one hour, which may be sufficient for changing the environmental temperature of the battery pack 1a or the rechargeable battery 14 to be charged and increasing the battery voltage Vb, and if the battery voltage Vb detected by the battery voltage detection unit 18 exceeds the threshold voltage Vth, the heater control unit 215a turns ON the heater switching element SW3 once again and attempts to melt the temperature fuses F1, F2.

Figure 5:
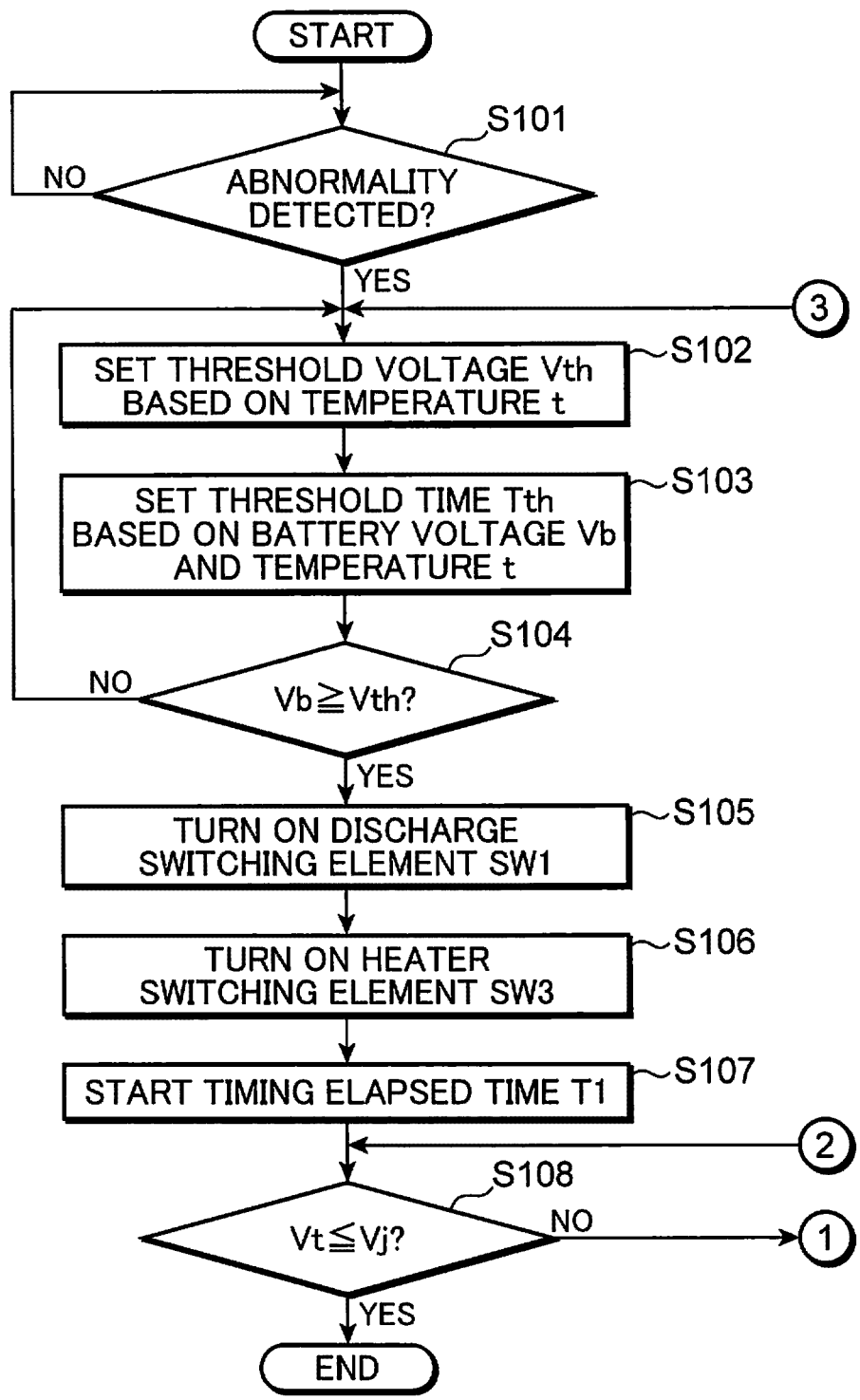
FIG. 5 is a flowchart showing an example of the operation of the protection circuit depicted in FIG. 4.
Figure 6:
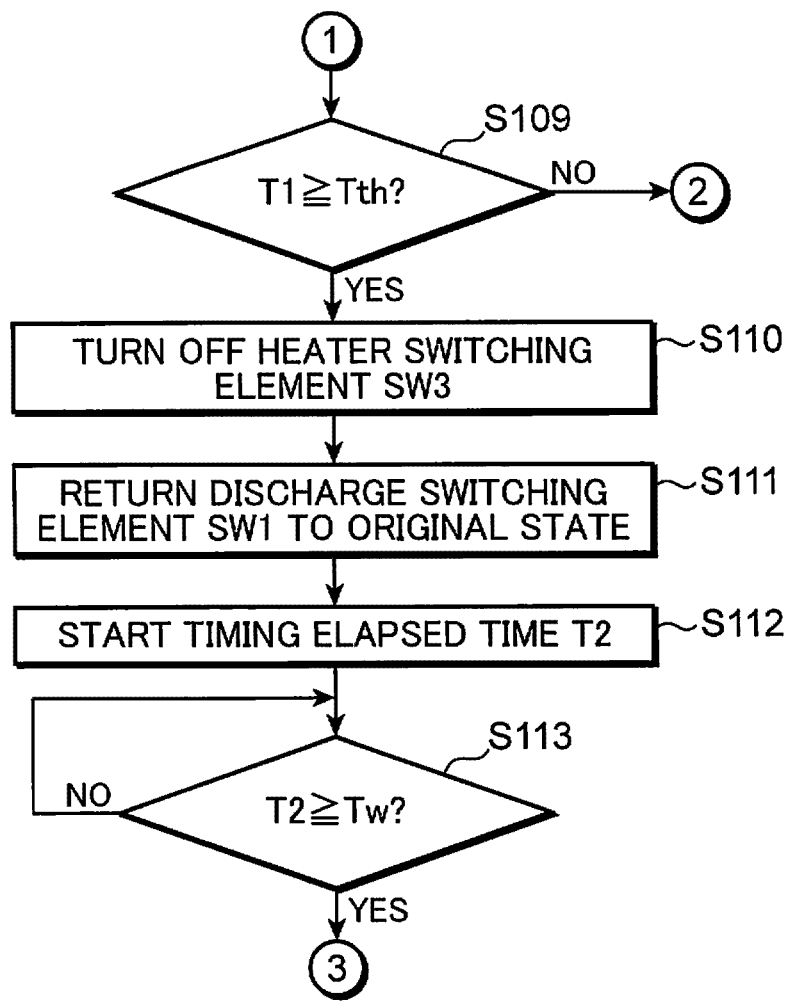
FIG. 6 is a flowchart showing an example of the operation of the protection circuit depicted in FIG. 4.

The operation of the protection circuit 2a configured as described above is now explained. FIG. 5 and FIG. 6 are flowcharts showing an example of the operation of the protection circuit 2a depicted in FIG. 4.

Foremost, the abnormality detection unit 210 confirms whether a second abnormality, in which the use of the rechargeable battery 14 should be permanently be prohibited, has occurred (step S101). If the occurrence of this kind of abnormality is detected by the abnormality detection unit 210 (YES at step S101), the threshold voltage setting unit 213 sets the threshold voltage Vth to a low voltage value as the temperature t detected by the temperature detection unit 21 rises (step S102).

Subsequently, the threshold time setting unit 218 sets the threshold time Tth to a short time as the battery voltage Vb detected by the battery voltage detection unit 18 rises, and to a short time as the temperature t detected by the temperature detection unit 21 rises (step S103).

Subsequently, the heater control unit 215a compares the battery voltage Vb detected by the battery voltage detection unit 18 and the threshold voltage Vth set with the threshold voltage setting unit 213 (step S104), and, if the battery voltage Vb is not less than the threshold voltage Vth (YES at step S104), since the temperature fuses F1, F2 can be melted with the battery voltage Vb, the heater control unit 215a turns ON the discharge switching element SW1 (step S105), and additionally turns ON the heater switching element SW3 (step S106).

Meanwhile, if the battery voltage Vb is less than the threshold voltage Vth (NO at step S104), the heater control unit 215a repeats steps S102 to S104 once again. Consequently, the heater control unit 215a does not turn ON the heater switching element SW3 until the battery voltage Vb exceeds the threshold voltage Vth and the temperature fuses F1, F2 can be melted with the amount of heat generated by the heater Rh based on the battery voltage Vb.

Consequently, since the heater control unit 215a will not cause the heater Rh to generate heat if it is considered that the temperature fuses F1, F2 cannot be melted due to the insufficient amount of heat generated by the heater Rh even if the heater switching element SW3 is turned ON since the battery voltage Vb is low, it is possible to reduce the possibility of causing the temperature of the battery pack 1a to rise while the temperature fuses F1, F2 are not melted.

Moreover, at step S102, the threshold voltage setting unit 213 sets the threshold voltage Vth to be a low voltage value as the current temperature t of the temperature fuses F1, F2 rises, and, for example, the minimum battery voltage Vb capable of obtaining the amount of heat generation which is required for melting the temperature fuses F1, F2 with the heater Rh under the conditions of the temperature t is set as the threshold voltage Vth. Thus, unlike cases where the threshold voltage Vth is a fixed value as with the background art, it is possible to reduce the possibility of losing opportunities for melting the temperature fuses F1, F2 as a result of the heater control unit 215a not melting the temperature fuses F1, F2 since the battery voltage Vb is less than the threshold voltage Vth set to cases when the temperature t is low, even in cases where the temperature fuses F1, F2 can be melted even though the battery voltage Vb is low since the temperature t is high.

As described above, according to the processing of steps S101 to S106, it is possible to increase the opportunities for melting the temperature fuses F1, F2 in comparison to the background art in which the threshold voltage Vth is a fixed value.

Subsequently, the heater control unit 215a uses a timer circuit not shown to time the elapsed time T1 from the time that the heater switching element SW3 was turned ON at step S106 (step S107).

Moreover, the heater control unit 215a compares the terminal voltage Vt detected by the terminal voltage detection unit 22 and the determination voltage Vj (step S108). If the terminal voltage Vt is not greater than the determination voltage Vj (YES at step S108), the processing is ended since it is considered that the temperature fuses F1, F2 have been melted.

Here, since the temperature fuses F1, F2 are connected in series and the connection point of the temperature fuses F1, F2 is connected to the heater Rh, when the temperature fuses F1, F2 are melted, both the path (temperature fuse F2) for supplying the voltage from the rechargeable battery 14 to the heater Rh and the path (temperature fuse F1) for supplying the voltage from the connecting terminal 11 to the heater Rh are blocked to stop the generation of heat by the heater Rh, the heater Rh will not continue to generate heat after the temperature fuses F1, F2 are melted.

Meanwhile, if the terminal voltage Vt exceeds the determination voltage Vj (NO at step S108), since it is considered that the temperature fuses F1, F2 have not yet melted, the heater control unit 215a proceeds to step S109, and compares the elapsed time T1 timed with the timer circuit and the threshold time Tth set with the threshold time setting unit 218 (step S109).

If the elapsed time T1 is less than the threshold time Tth (NO at step S109), since there is a possibility that the temperature fuses F1, F2 can still be melted by continuing the generation of heat with the heater Rh, the heater control unit 215a repeats steps S108 to S109 while leaving the heater switching element SW3 left ON.

Meanwhile, if the elapsed time T1 is not less than the threshold time Tth (YES at step S109), since it is considered that the temperature fuses F1, F2 will not melt even if the generation of heat with the heater Rh is continued, the heater control unit 215a turns OFF the heater switching element SW3 and stops the generation of heat with the heater Rh (step S110), and returns the discharge switching element SW1 to a state before being forcibly turned ON at step S105 (step S111).

Even if the battery voltage Vb is not less than the threshold voltage Vth at step S104, there may be cases where the temperature fuses F1, F2 will not melt even if the battery voltage Vb to the heater Rh to generate heat due to variations in the characteristics of the temperature fuses F1, F2 and the heater Rh, changes in the environmental temperature, or changes in the battery voltage Vb.

In the foregoing case, if the generation of heat with the heater Rh is continued, there may be a possibility that the temperature of the battery pack 1a will rise without being able to melt the temperature fuses F1, F2. Nevertheless, since the heater control unit 215a turns OFF the heater switching element SW3 and stops the generation of heat with the heater Rh if the elapsed time T1 is not less than the threshold time Tth, it is possible to reduce the possibility of the temperature of the battery pack 1a continuing to rise without being able to melt the temperature fuses F1, F2.

Moreover, since the threshold time setting unit 218 sets the threshold time Tth to be a short time as the battery voltage Vb rises and sets the threshold time Tth to a short time as to the temperature t rises, the threshold time Tth is set to a short time in cases where the temperature fuses F1, F2 should melt in a short period under normal circumstances such as when the battery voltage Vb is high or when the temperature t is high.

Consequently, it is possible to determine that the temperature fuses F1, F2 will not melt in a short time in comparison to cases where the threshold time Tth is a fixed value, and thereby reduce the possibility of unnecessarily continuing the generation of heat with the heater Rh.

Subsequently, the heater control unit 215a uses a timer circuit not shown to time the elapsed time T2 from the time that the heater switching element SW3 was turned OFF at step S110 (step S112). If the elapsed time T2 is not less than the waiting time Tw (YES at step S113), the heater control unit 215a attempts to melt the temperature fuses F1, F2 by repeating the processing of step S102 onward once again.

Specifically, even in cases where it is determined at step S109 that the temperature fuses F1, F2 will not melt even upon causing the heater Rh to generate heat, if time that is not less than the waiting time Tw has elapsed and the environmental temperature has risen during that time and the temperature t has consequently risen, or the rechargeable battery 14 is charged and the battery voltage Vb has risen during that time, there may be cases where the temperature fuses F1, F2 can be melted by repeating the processing of step S102 onward once again. It is thereby possible to increase the opportunities for melting the temperature fuses F1, F2.

Note that, although a case was explained where the temperature fuses F1, F2 are inserted between the charge switching element SW2 and the connecting terminal 11, the temperature fuses F1, F2 may also be provided between the rechargeable battery 14 and the discharge switching element SW1. In the foregoing case, steps S105, S111 are not required. Moreover, the temperature fuses F1, F2, the discharge switching element SW1, and the charge switching element SW2 may also be provided between the connecting terminal 12 and the rechargeable battery 14.

In cases where an abnormality of the second battery is detected by the second abnormality detection unit, if the battery voltage of the rechargeable battery detected by the battery voltage detection unit exceeds the threshold voltage set with the threshold voltage setting unit and it is considered that the temperature fuses can be melted with the amount of heat that is generated with the heater based on the battery voltage, the battery voltage of the rechargeable battery is supplied to the heater via the conductive path, and the temperature fuses are melted with the heat generated by the heater. Consequently, since the conductive path between the rechargeable battery and the first connecting terminal is blocked, the protection circuit configured as described above is able to prohibit the use of the rechargeable battery if an abnormality occurs in the rechargeable battery.

Here, since the threshold voltage setting unit sets the threshold temperature so that the threshold voltage is lowered relative to the temperature relating to the temperature fuses detected by the temperature detection unit; for example, the temperature of the temperature fuses and the environmental temperature being high, the heater control melts the temperature fuses even if the voltage of the connecting terminal is low if the temperature relating to the temperature fuses is high and the temperature fuses are in a state of being easily melted. Accordingly, in comparison to cases where the predetermined value to be used as a reference for whether or not to melt the fuses is a fixed value as with the background art, it is possible to reduce the possibility of the melting of the temperature fuses being delayed, or not being able to melt the temperature fuses.

Moreover, in comparison to cases where the predetermined value to be used as a reference for whether or not to melt the fuses is a fixed value as with the background art in a battery pack comprising a rechargeable battery, the battery pack configured as described above is possible to reduce the possibility of the melting of the temperature fuses being delayed, or not being able to melt the temperature fuses.

Specifically, the protection circuit according to one aspect of the present invention has: a connecting terminal for receiving a voltage for charging a rechargeable battery; a switching element interposed between the connecting terminal and the rechargeable battery; a temperature fuse for blocking a conductive path between the connecting terminal and the switching element; a heater for melting the temperature fuse; a voltage detection unit for detecting a voltage relating to the conductive path; a first abnormality detection unit for detecting occurrence of a first abnormality that is pre-set as a recoverable abnormality; a second abnormality detection unit for detecting occurrence of a second abnormality that is pre-set as an abnormality on the basis of which the temperature fuse should be melted; a protection control unit for turning OFF the switching element when the first abnormality is detected by the first abnormality detection unit; and a heater control unit for executing a temperature fuse melting process of applying the voltage of the conductive path to the heater when the second abnormality is detected by the second abnormality detection unit and the voltage detected by the voltage detection unit is not less than a predetermined threshold voltage.

According to the foregoing configuration, if a first abnormality is detected by the first abnormality detection unit, the switching element is turned OFF and the connection between the connecting terminal and the rechargeable battery is blocked in order to protect the rechargeable battery. If a second abnormality is detected by the second abnormality detection unit and the voltage detected by the voltage detection unit is not less than the threshold voltage that is set as a voltage capable of causing the heater to generate heat to melt the temperature fuses, the voltage received by the connecting terminal is supplied by the heater control unit to the heater via the conductive path, and the temperature fuses are melted with the heat generated by the heater.

Here, since the voltage is supplied to the heater from the conductive path between the connecting terminal and the switching element, it is possible to melt the temperature fuses using the voltage received from the connecting terminal even in cases where the switching element is turned OFF and the discharge of the rechargeable battery is prohibited. Consequently, it is possible to reduce the occasions of discharging the rechargeable battery upon melting the temperature fuses in comparison to the background art described in Patent Document 1.

Meanwhile, even in cases where a second abnormality is detected by the second abnormality detection unit and the temperature fuses should be melted, if the voltage detected by the voltage detection unit is less than the threshold voltage and, therefore, it is considered that the temperature fuses cannot be melted with the amount of heat generated with the heater based on the voltage of the conductive path, voltage is not supplied to the heater, and the possibility of the heater continuing to generate heat with the amount of heat generation that is unable to melt the temperature fuse is reduced.

Moreover, preferably, the voltage detection unit is a terminal voltage detection unit for detecting a voltage of the connecting terminal.

According to the foregoing configuration, since the voltage of the connecting terminal can be detected by the terminal voltage detection unit regardless of the ON/OFF state of the switching element, for example, as in cases where the battery voltage detection unit for detecting the battery voltage of the rechargeable battery is used as the voltage detection unit, it is not necessary to temporarily turn ON the switching element in order to detect the voltage of the connecting terminal while the switching element is turned OFF.

Moreover, preferably, the protection circuit further has a battery voltage detection unit for detecting a battery voltage of the rechargeable battery, wherein the heater control unit forcibly turns ON the switching element and applies the voltage of the conductive path to the heater when the second abnormality is detected by the second abnormality detection unit and moreover when the voltage detected by the terminal voltage detection unit is less than the threshold voltage and the battery voltage detected by the battery voltage detection unit is not less than the threshold voltage.

According to the foregoing configuration, even in cases where the voltage received by the connecting terminal is less than the threshold voltage and, therefore, it is considered that the temperature fuses cannot be melted with the amount of heat generated with the heater based on the voltage received by the connecting terminal, if the battery voltage detected by the battery voltage detection unit is not less than the threshold voltage and it is therefore considered that the temperature fuses can be melted with the amount of heat generated with the heater based on the battery voltage, the heater control unit forcibly turns ON the switching element in order to connect the rechargeable battery to the conductive path, and the battery voltage of the rechargeable battery is thereby supplied to the heater via the conductive path. The temperature fuses are thereby melted with the heat generated by the heater. Note that the expression "forcibly turn ON" refers to the case of the switching element being turned ON by the heater control unit even in cases where the switching element has been turned OFF by the protection control unit.

In the foregoing case, even in cases where the temperature fuses cannot be melted with the voltage received by the connecting terminal, since the temperature fuses can be melted with the battery voltage, it is possible to reduce the possibility that the temperature fuses cannot be melted. Moreover, even if the battery voltage is not less than the threshold voltage, if the voltage of the connecting terminal is not less than the threshold voltage, since the temperature fuses can be melted without having to discharge the rechargeable battery, it is possible to reduce the occasions of discharging the rechargeable battery upon melting the temperature fuses in comparison to the technology described in Patent Document 1.

Moreover, preferably, the protection circuit further has a voltage output requesting unit for requesting of a charging unit, which outputs to the connecting terminal a voltage according to the request, a voltage output that is not less than the threshold voltage when the second abnormality is detected by the second abnormality detection unit, wherein the heater control unit applies the voltage of the conductive path to the heater as the temperature fuse melting process when the voltage detected by the terminal voltage detection unit is not less than the threshold voltage after the voltage output is requested by the voltage output requesting unit.

According to the foregoing configuration, if a second abnormality is detected by the second abnormality detection unit, the voltage output requesting unit requests a voltage output that is not less than the threshold voltage to the charging unit. Consequently, for example, unless there are circumstances where the charging unit is unable to output the requested voltage such as the charging unit not being connected to the connecting terminal, a voltage that is not less than the threshold voltage will be output to the connecting terminal. Subsequently, after the voltage output request by the voltage output requesting unit, whether the voltage detected by the terminal voltage detection unit is not less than the threshold voltage is confirmed, and, if such voltage is not less than the threshold voltage, the voltage being applied to the conductive path; that is, the voltage from the charging unit is supplied to the heater and the temperature fuses can thereby be melted. Thus, it is possible to increase the opportunities for melting the temperatures fuses without having to discharge the rechargeable battery.

Moreover, preferably, the heater control unit does not apply the voltage of the conductive path to the heater if the voltage detected by the terminal voltage detection unit is less than the threshold voltage.

According to the foregoing configuration, if the voltage detected by the terminal voltage detection unit is less than the threshold voltage and, therefore, it is considered that the temperature fuses cannot be melted with the amount of heat generated with the heater based on the voltage received by the connecting terminal, since the supply of voltage to the heater from the connecting terminal via the conductive path is blocked, it is possible to reduce the possibility of the heater continuing to generate heat with the amount of heat generation that is unable to melt the temperature fuse.

Moreover, preferably, the heater control unit determines that the melting of the temperature fuse is difficult and does not apply the voltage of the conductive path to the heater when the voltage detected by the terminal voltage detection unit is less than the threshold voltage and the battery voltage detected by the battery voltage detection unit is less than the threshold voltage.

According to the foregoing configuration, if the voltage detected by the terminal voltage detection unit is less than the threshold voltage and the battery voltage detected by the battery voltage detection unit is less than the threshold voltage; that is, if it is considered that the temperature fuses cannot be melted even if the heater is caused to generate heat with either the voltage received by the connecting terminal or the battery voltage of the rechargeable battery, since the supply of voltage to the heater from the connecting terminal and the rechargeable battery via the conductive path is blocked, it is possible to reduce the possibility of the heater continuing to generate heat with the amount of heat generation that is unable to melt the temperature fuse.

Moreover, preferably, the heater control unit applies the voltage of the conductive path to the heater when the voltage detected by the terminal voltage detection unit is not less than the threshold voltage in a case where a pre-set waiting time has elapsed after determination is made that the melting of the temperature fuse is difficult, meanwhile even if the voltage detected by the terminal voltage detection unit is less than the threshold voltage, the heater control unit applies the voltage of the conductive path to the heater when the voltage detected by the terminal voltage detection unit is less than the threshold voltage and when the battery voltage detected by the battery voltage detection unit is not less than the threshold voltage.

Even in cases where the heater control unit determines that the temperature fuses cannot be melted even upon causing the heater to generate heat and blocks the voltage supply, if the conditions subsequently change such as the connecting terminal receiving a voltage that is not less than the threshold voltage, there may be cases where the temperature fuses can be melted. Thus, after the lapse of waiting time in which such change in conditions can be expected, the heater control unit supplies the voltage received by the connecting terminal to the heater via the conductive path if the voltage detected by the terminal voltage detection unit is not less than the threshold voltage, and, if the voltage detected by the terminal voltage detection unit is less than the threshold voltage and the battery voltage detected by the battery voltage detection unit is not less than the threshold voltage, supplies such battery voltage to the heater via the conductive path so as to increase the opportunities for melting the temperature fuses.

Moreover, preferably, the protection circuit further has a temperature detection unit for detecting a temperature relating to the temperature fuse, and a threshold voltage setting unit for lowering the threshold voltage as the temperature detected by the temperature detection unit rises.

According to the foregoing configuration, since the threshold voltage setting unit sets the threshold temperature so that the threshold voltage is lowered relative to the temperature relating to the temperature fuses detected by the temperature detection unit; for example, the temperature of the temperature fuses and the environmental temperature being high, the heater control melts the temperature fuses even if the voltage of the connecting terminal is low if the temperature relating to the temperature fuses is high and the temperature fuses are in a state of being easily melted. It is thereby possible to increase the opportunities for melting the temperature fuses.

Moreover, preferably, the protection control unit further turns OFF the switching element when the second abnormality is detected by the second abnormality detection unit.

According to the foregoing configuration, if a second abnormality is detected by the second abnormality detection unit, the safety is improved since the connection of the rechargeable battery and the connecting terminal can be promptly blocked regardless of whether or not the temperature fuses were melted.

Moreover, the voltage detection unit may be a battery voltage detection unit for detecting a battery voltage of the rechargeable battery, and the protection circuit may further have a temperature detection unit for detecting a temperature relating to the temperature fuse, and a threshold voltage setting unit for lowering the threshold voltage as the temperature detected by the temperature detection unit rises.

According to the foregoing configuration, in cases where an abnormality of the second battery is detected by the second abnormality detection unit, if the battery voltage of the rechargeable battery detected by the battery voltage detection unit exceeds the threshold voltage set with the threshold voltage setting unit and it is considered that the temperature fuses can be melted with the amount of heat that is generated with the heater based on the battery voltage, the battery voltage of the rechargeable battery is supplied to the heater via the conductive path, and the temperature fuses are melted with the heat generated by the heater. Consequently, since the conductive path between the rechargeable battery and the connecting terminal is blocked, it is possible to prohibit the use of the rechargeable battery if an abnormality occurs in the rechargeable battery.

Here, since the threshold voltage setting unit sets the threshold temperature so that the threshold voltage is lowered relative to the temperature relating to the temperature fuses detected by the temperature detection unit; for example, the temperature of the temperature fuses and the environmental temperature being high, the heater control melts the temperature fuses even if the voltage of the connecting terminal is low if the temperature relating to the temperature fuses is high and the temperature fuses are in a state of being easily melted. Accordingly, in comparison to cases where the predetermined value to be used as a reference for whether or not to melt the fuses is a fixed value as with the background art, it is possible to reduce the possibility of the melting of the temperature fuses being delayed, or not being able to melt the temperature fuses.

Meanwhile, even in cases where an abnormality of the rechargeable battery is detected by the second abnormality detection unit, if the voltage detected by the battery voltage detection unit is less than the threshold voltage; that is, if it is considered that the temperature fuses cannot be melted with the amount of heat that is generated with the heater based on the battery voltage, since the supply of voltage to the heater is blocked and the heater will not generate heat, it is possible to reduce the possibility of the heater continuing to generate heat with the amount of heat generation that is unable to melt the temperature fuse.

Here, since it is difficult to melt the temperature fuses if the temperature relating to the temperature fuses is low, if the threshold voltage is set to the same voltage value as in cases of a high temperature, there may be cases where the heater will generate heat even though it is a battery voltage that is unable to melt the temperature fuses in cases of a low temperature. Nevertheless, according to the foregoing configuration, since the threshold voltage setting unit sets the threshold voltage so that the threshold voltage is raised as the temperature relating to the temperature fuses detected by the temperature detection unit decreases, in a state of a low temperature where melting of the temperature fuses is difficult, voltage is not supplied by the heater control unit to the heater unless the battery voltage is higher than in a case of high temperature. Consequently, it is possible to reduce the possibility of the heater continuing to generate heat with the amount of heat generation that is unable to melt the temperature fuse regardless of the temperature relating to the temperature fuses.

Moreover, preferably, the protection circuit further has a terminal voltage detection unit for detecting a voltage of the connecting terminal, wherein the heater control unit determines that the temperature fuse is not to be melt and stops the application of the voltage to the heater when the elapsed time from the start of application of the voltage to the heater exceeds a threshold time set as the time required for melting the temperature fuse, and when the voltage detected by the terminal voltage detection unit exceeds a pre-set determination voltage for determining that the voltage is not zero.

According to the foregoing configuration, since the connecting terminal is connected to the rechargeable battery via the conductive path, the battery voltage will be supplied to the connecting terminal if the temperature fuses for blocking the conductive path are not melted. Subsequently, when the elapsed time from the start of voltage supply to the heater exceeds the threshold time set as the time that the temperature fuses can be melted, if the voltage between the connecting terminals detected by the terminal voltage detection unit exceeds a determination voltage and is not zero, this means that the temperature fuses did not melt even if the generation of heat by the heater was continued for a period that should have melted the temperature fuses under normal circumstances. In the foregoing case, since the possibility that the temperature fuses will not melt even if the generation of heat by the heater is further continued is low, the heater control unit blocks the voltage supply from the conductive path to the heater. It is thereby possible to reduce the possibility of the heater continuing to generate heat without being able to melt the temperature fuses.

Moreover, preferably, the protection circuit further has a threshold time setting unit for setting the threshold time to be shorter as the voltage detected by the battery voltage detection unit rises.

The amount of heat generated by the heater will increase as the supplied voltage rises, and the time required for melting the temperature fuses is shortened. Thus, the threshold time setting unit can improve the accuracy of the threshold time by setting the threshold time to be a short time as the voltage detected by the battery voltage detection unit rises. Consequently, it is possible to reduce the possibility of the heater continuing to generate heat without being able to melt the temperature fuses, or missing the opportunities for melting the temperature fuses as a result of stopping the heat generated by the heater too soon.

Moreover, preferably, the protection circuit further has a threshold time setting unit for setting the threshold time to be shorter as the temperature detected by the temperature detection unit rises.

The time required for melting the temperature fuses will be shorter as the temperature detected by the temperature detection unit rises. Thus, the threshold time setting unit can improve the accuracy of the threshold time by setting the threshold time to be a short time as the temperature detected by the temperature detection unit rises. Consequently, it is possible to reduce the possibility of the heater continuing to generate heat without being able to melt the temperature fuses, or missing the opportunities for melting the temperature fuses as a result of stopping the heat generated by the heater too soon.

Moreover, preferably, the protection circuit further has a threshold time setting unit for setting the threshold time to be shorter as the voltage detected by the battery voltage detection unit rises, and for setting the threshold time to be shorter as the temperature detected by the temperature detection unit rises.

According to the foregoing configuration, since the threshold time setting unit sets the threshold voltage based on both the voltage detected by the battery voltage detection unit and the temperature detected by the temperature detection unit, the accuracy of the threshold time is improved in comparison to cases of only using one.

Moreover, preferably, the heater control unit applies the voltage of the conductive path to the heater when a pre-set waiting time has elapsed after determination is made that the temperature fuse is not to be melt, and when the battery voltage detected by the battery voltage detection unit exceeds the threshold voltage.

Even in cases where the heater control unit determines that it is not possible to melt the fuses even if the heater generates heater beyond the threshold time and blocks the voltage supply since the temperature fuses will not melt, there may be cases where the temperature fuses can be melted based on subsequent changes in the conditions; for example, changes in the environmental temperature or the battery voltage of the rechargeable battery. Thus, after the lapse of the waiting time where such change in conditions can be expected, the heater control unit supplies voltage to the heater once again if the voltage detected by the battery voltage detection unit exceeds the threshold voltage, and thereby increases the opportunities for melting the temperature fuses.

Moreover, preferably, the protection circuit further has a heater switching element for controlling heat generation of the heater, and the connecting terminal includes a first connecting terminal connected to one pole of the rechargeable battery via the conductive path and the switching element, and a second connecting terminal connected to another pole of the rechargeable battery, the temperature fuse is configured by two temperature fuses, which are to be melted by the heater, and which are connected in series, a connection point of the two temperature fuses is connected to the second connecting terminal via the heater and the heater switching element, and the heater control unit applies the voltage of the conductive path to the heater by turning ON the heater switching element, and stops the application of the voltage from the conductive path to the heater by turning OFF the heater switching element.

According to the foregoing configuration, the supply of voltage to the heater can be controlled based on the ON/OFF of the heater switching element. Since two temperature fuses are connected in series and their connection point is connected to the connecting terminal of the second connecting terminal via the heater and the heater switching element, if the two temperature fuses are melted by the heat generated with the heater, both the voltage supply path from the rechargeable battery to the heater and the voltage supply path from the first connecting terminal to the heater are blocked and the generation of heat by the heater is stopped. Thus, the heater will not continue to generate heat after the temperature fuses are melted.

Moreover, preferably, the protection circuit further has a heater switching element for controlling heat generation of the heater, and the temperature fuse is configured by two temperature fuses to be melted with the heater being connected in series, the heater switching element is used for opening and closing a path for supplying the voltage of the connection point of the two temperature fuses to the heater, and the heater control unit supplies the voltage, which is being applied to the conductive path, to the heater by turning ON the heater switching element, and stops the application of the voltage to the heater by turning OFF the heater switching element.

According to the foregoing configuration, two temperature fuses are connected in series, the path for supplying the voltage of their connection point to the heater is opened and closed based on the ON/OFF of the heater switching element, and the voltage supply to the heater is thereby controlled. According to this configuration, if the two temperature fuses are melted by the heat generated with the heater, both the voltage supply path from the connecting terminal to the heater via the conductive path and the voltage supply path from the rechargeable battery to the heater via the conductive path are blocked and the generation of heat by the heater is stopped. Thus, the heater will not continue to generate heat after the temperature fuses are melted.

Moreover, the battery pack according to one aspect of the present invention has the foregoing protection circuit, and the rechargeable battery.

According to the foregoing configuration, with a battery path having a rechargeable battery, in comparison to cases where the predetermined value to be used as a reference for whether or not to melt the fuses is a fixed value as with the background art, it is possible to reduce the possibility of the melting of the temperature fuses being delayed, or not being able to melt the temperature fuses.

Otherwise, according to the foregoing configuration, with a battery pack having a rechargeable battery, since the temperature fuses can be melted using the voltage received by the connecting terminal, it is possible to reduce the occasions of discharging the rechargeable battery in comparison to the technology described in Patent Document 1 upon melting the temperature fuses.

Moreover, the charging system according to one aspect of the present invention has the foregoing protection circuit, the rechargeable battery, and the charging unit.

According to the foregoing configuration, it is possible to increase the occasions for melting the temperature fuse without having to discharge the rechargeable battery.

This application claims priority to Japanese Patent Application No. 2009-178898, filed on Jul. 31, 2009, and Japanese Patent Application No. 2009-190873, filed on Aug. 20, 2009, the contents of which are hereby incorporated by reference into the present application.

Note that the specific embodiments and examples in the detailed description of the invention are merely provided for demonstrating the technical content of the present invention, and the present invention should not be interpreted narrowly by being limited to such specific examples. Thus, the present invention may be implemented in various modes within the spirit of this invention and the scope of claims provided below.

INDUSTRIAL APPLICABILITY

The protection circuit of a rechargeable battery according to one aspect of the present invention and the battery pack having the foregoing protection circuit can be suitably used the protection circuit of a rechargeable battery and the battery pack to be used in a battery-mounted device of various electronic devices such as portable personal computers, digital cameras and cell phones, vehicles such as electrical vehicles and hybrid cars, and power systems that combine solar batteries and generators with rechargeable batteries.

The invention claimed is:

1. A protection circuit, comprising:
a connecting terminal for receiving a voltage for charging a rechargeable battery;
a switching element interposed between the connecting terminal and the rechargeable battery;
a temperature fuse for blocking a conductive path between the connecting terminal and the switching element;
a heater for melting the temperature fuse;
a voltage detection unit for detecting a voltage relating to the conductive path;
a first abnormality detection unit for detecting occurrence of a first abnormality that is pre-set as a recoverable abnormality;
a second abnormality detection unit for detecting occurrence of a second abnormality that is pre-set as an abnormality on the basis of which the temperature fuse should be melted;
a protection control unit for turning OFF the switching element when the first abnormality is detected by the first abnormality detection unit;
a heater control unit for executing a temperature fuse melting process of applying the voltage of the conductive path to the heater when the second abnormality is detected by the second abnormality detection unit and the voltage detected by the voltage detection unit is not less than a predetermined threshold voltage;
a temperature detection unit for detecting a temperature relating to the temperature fuse; and
a threshold voltage setting unit for lowering the threshold voltage as the temperature detected by the temperature detection unit rises,
wherein the voltage detection unit is a terminal voltage detection unit for detecting a voltage of the connecting terminal.

2. The protection circuit according to claim 1, further comprising a battery voltage detection unit for detecting a battery voltage of the rechargeable battery,
wherein the heater control unit forcibly turns ON the switching element and applies the voltage of the conductive path to the heater when the second abnormality is detected by the second abnormality detection unit, and when the voltage detected by the terminal voltage detection unit is less than the threshold voltage and moreover when the battery voltage detected by the battery voltage detection unit is not less than the threshold voltage.

3. The protection circuit according to claim 1, further comprising:
a voltage output requesting unit for requesting of a charging unit, which outputs to the connecting terminal a voltage in accordance with the request, a voltage output that is not less than the threshold voltage when the second abnormality is detected by the second abnormality detection unit,
wherein the heater control unit applies the voltage of the conductive path to the heater as the temperature fuse melting process when the voltage detected by the terminal voltage detection unit is not less than the threshold voltage after the voltage output is requested by the voltage output requesting unit.

4. The protection circuit according to claim 1, wherein the heater control unit does not apply the voltage of the conductive path to the heater when the voltage detected by the terminal voltage detection unit is less than the threshold voltage.

5. The protection circuit according to claim 2, wherein the heater control unit determines that the melting of the temperature fuse is difficult and does not apply the voltage of the conductive path to the heater when the voltage detected by the terminal voltage detection unit is less than the threshold voltage and the battery voltage detected by the battery voltage detection unit is less than the threshold voltage.

6. The protection circuit according to claim 5, wherein the heater control unit applies the voltage of the conductive path to the heater when the voltage detected by the terminal voltage detection unit is not less than the threshold voltage in a case where a pre-set waiting time has elapsed after determination is made that the melting of the temperature fuse is difficult, meanwhile even if the voltage detected by the terminal voltage detection unit is less than the threshold voltage, the heater control unit applies the voltage of the conductive path to the heater when the voltage detected by the terminal voltage detection unit is less than the threshold voltage and when the battery voltage detected by the battery voltage detection unit is not less than the threshold voltage.

7. The protection circuit according to claim 1, wherein the protection control unit further turns OFF the switching element when the second abnormality is detected by the second abnormality detection unit.

8. A charging system, comprising:
the protection circuit according to claim 3;
the rechargeable battery; and
the charging unit.

9. A protection circuit, comprising:
a connecting terminal for receiving a voltage for charging a rechargeable battery;
a switching element interposed between the connecting terminal and the rechargeable battery;
a temperature fuse for blocking a conductive path between the connecting terminal and the switching element;
a heater for melting the temperature fuse;
a voltage detection unit for detecting a voltage relating to the conductive path;
a first abnormality detection unit for detecting occurrence of a first abnormality that is pre-set as a recoverable abnormality;
a second abnormality detection unit for detecting occurrence of a second abnormality that is pre-set as an abnormality on the basis of which the temperature fuse should be melted;
a protection control unit for turning OFF the switching element when the first abnormality is detected by the first abnormality detection unit; and a heater control unit for executing a temperature fuse melting process of applying the voltage of the conductive path to the heater when the second abnormality is detected by the second abnormality detection unit and the voltage detected by the voltage detection unit is not less than a predetermined threshold voltage, wherein the voltage detection unit is a battery voltage detection unit for detecting a battery voltage of the rechargeable battery, and the protection circuit further comprises:

a temperature detection unit for detecting a temperature relating to the temperature fuse; and a threshold voltage setting unit for lowering the threshold voltage as the temperature detected by the temperature detection unit rises.

10. The protection circuit according to claim 9, further comprising:

a terminal voltage detection unit for detecting a voltage of the connecting terminal, wherein the heater control unit determines that the temperature fuse is not to be melt and stops the application of the voltage to the heater when the elapsed time from the start of application of the voltage to the heater exceeds a threshold time set as the time required for melting the temperature fuse, and when the voltage detected by the terminal voltage detection unit exceeds a pre-set determination voltage for determining that the voltage is not zero.

11. The protection circuit according to claim 10, further comprising:

a threshold time setting unit for setting the threshold time to be shorter as the voltage detected by the battery voltage detection unit rises.

12. The protection circuit according to claim 10, further comprising:

a threshold time setting unit for setting the threshold time to be shorter as to the temperature detected by the temperature detection unit rises.

13. The protection circuit according to claim 10, further comprising:

a threshold time setting unit for setting the threshold time to be shorter as the voltage detected by the battery voltage detection unit rises, and for setting the threshold time to be shorter as the temperature detected by the temperature detection unit rises.

14. The protection circuit according to claim 10, wherein the heater control unit applies the voltage of the conductive path to the heater when a pre-set waiting time has elapsed after determination is made that the temperature fuse is not to be melt and when the battery voltage detected by the battery voltage detection unit exceeds the threshold voltage.

15. The protection circuit according to claim 1, further comprising:

a heater switching element for controlling heat generation of the heater, wherein the connecting terminal includes a first connecting terminal connected to one pole of the rechargeable battery via the conductive path and the switching element, and a second connecting terminal connected to another pole of the rechargeable battery, the temperature fuse is configured by two temperature fuses which are to be fused by the heater and which are connected in series, a connection point of the two temperature fuses is connected to the second connecting terminal via the heater and the heater switching element, and wherein the heater control unit applies the voltage of the conductive path to the heater by turning ON the heater switching element, and stops the application of the voltage from the conductive path to the heater by turning OFF the heater switching element.

16. A battery pack, comprising:

the protection circuit according to claim 1; and the rechargeable battery.

17. A battery pack, comprising:

the protection circuit according to claim 9; and the rechargeable battery.

* * * * *